(12) United States Patent
Koolen et al.

(10) Patent No.: US 12,397,422 B2
(45) Date of Patent: Aug. 26, 2025

(54) ROBOT MOVEMENT AND INTERACTION WITH MASSIVE BODIES

(71) Applicant: Boston Dynamics, Inc., Waltham, MA (US)

(72) Inventors: Frans Anton Koolen, Cambridge, MA (US); Robin Deits, Lexington, MA (US)

(73) Assignee: Boston Dynamics, Inc., Waltham, MA (US)

( * ) Notice: Subject to any disclaimer, the term of this patent is extended or adjusted under 35 U.S.C. 154(b) by 301 days.

(21) Appl. No.: 18/073,630

(22) Filed: Dec. 2, 2022

(65) Prior Publication Data

US 2024/0181635 A1  Jun. 6, 2024

(51) Int. Cl.
*B25J 9/16* (2006.01)

(52) U.S. Cl.
CPC .......... *B25J 9/1638* (2013.01); *B25J 9/1633* (2013.01); *B25J 9/1666* (2013.01)

(58) Field of Classification Search
None
See application file for complete search history.

(56) References Cited

U.S. PATENT DOCUMENTS

| | | | |
|---|---|---|---|
| 9,186,795 B1 * | 11/2015 | Edsinger | B25J 11/0065 |
| 10,017,218 B1 | 7/2018 | Swilling et al. | |
| 11,560,192 B2 | 1/2023 | Bai et al. | |
| 11,833,680 B2 | 12/2023 | Deits et al. | |
| 2007/0016329 A1 | 1/2007 | Herr et al. | |
| 2007/0084278 A1 | 4/2007 | Kawal et al. | |
| 2011/0106309 A1 | 5/2011 | Lim et al. | |
| 2012/0158182 A1 | 6/2012 | Lee et al. | |
| 2012/0290131 A1 | 11/2012 | Khoukhi | |
| 2012/0316684 A1 | 12/2012 | Lee et al. | |
| 2014/0025201 A1 | 1/2014 | Ryu et al. | |

(Continued)

FOREIGN PATENT DOCUMENTS

| | | |
|---|---|---|
| CN | 108621165 A | 10/2018 |
| CN | 112000088 A | 11/2020 |

(Continued)

OTHER PUBLICATIONS

B. J. Stephens and C. G. Atkeson, "Dynamic Balance Force Control for compliant humanoid robots," 2010 IEEE/RSJ International Conference on Intelligent Robots and Systems, Taipei, Taiwan, 2010, pp. 1248-1255, doi: 10.1109/IROS.2010.5648837 (Year: 2010).*

(Continued)

*Primary Examiner* — Wade Miles
*Assistant Examiner* — Jerrod Irvin Davis
(74) *Attorney, Agent, or Firm* — Pierce Atwood LLP

(57) ABSTRACT

The invention includes systems and methods for determining movement of a robot. A computing system of the robot receives information comprising a reference behavior specification, a current state of the robot, and a characteristic of a massive body coupled to or expected to be coupled to the robot. The computing system determines, based on the information, a set of movement parameters for the robot, the set of movement parameters reflecting a goal trajectory for the robot. The computing system instructs the robot to move consistent with the set of movement parameters.

24 Claims, 16 Drawing Sheets

(56) References Cited

U.S. PATENT DOCUMENTS

| | | |
|---|---|---|
| 2015/0051734 A1 | 2/2015 | Zheng et al. |
| 2016/0016311 A1 | 1/2016 | Konolige et al. |
| 2016/0221187 A1 | 8/2016 | Bradski et al. |
| 2019/0143517 A1 | 5/2019 | Yang et al. |
| 2020/0086482 A1 | 3/2020 | Johnson et al. |
| 2020/0171657 A1 | 6/2020 | Baier et al. |
| 2021/0107150 A1 | 4/2021 | Whitman et al. |
| 2021/0197370 A1 | 7/2021 | Chen et al. |
| 2022/0089234 A1 | 3/2022 | Sprowitz et al. |
| 2023/0016514 A1 | 1/2023 | Zheng et al. |
| 2023/0117928 A1 | 4/2023 | Bellicoso et al. |
| 2023/0339107 A1* | 10/2023 | Gordon .............. B25J 13/006 |

FOREIGN PATENT DOCUMENTS

| | | |
|---|---|---|
| WO | 2021065196 A1 | 4/2021 |
| WO | 2021101514 A1 | 5/2021 |

OTHER PUBLICATIONS

Alonso-Mora, et al., "Multi-Robot Navigation in Formation via Sequential Convex Programming," 2015, IEEE/RSJ International Conference on Intelligent Robots and Systems (IROS), Congress Center Hamburg, Germany, Sep. 28, 2015, pp. 4634-4641.

Budhiraja et al., Dynamics consensus between centroidal and whole-body models for locomotion of legged robots. 2019 International Conference on Robotics and Automation (ICRA). Apr. 2019. 8 pages.

Carpentier et al., A versatile and efficient pattern generator for generalized legged locomotion. 2016 IEEE International Conference on Robotics and Automation (ICRA). May 2016. 8 pages.

Dafarra et al., Whole-Body Walking Generation using Contact Parametrization: A Non-Linear Trajectory Optimization Approach. arXiv:2003.04633v1. Mar. 10, 2020. 7 pages.

Dai et al., Whole-body motion planning with centroidal dynamics and full kinematics. 2014 IEEE-RAS International Conference on Humanoid Robots. Nov. 2014. 8 pages.

Fallon et al., An Architecture for Online Affordance-based Perception and Whole-body Planning. Computer Science and Artificial Intelligence Laboratory Technical Report. Mar. 16, 2014. 31 pages.

Hughes, Don't Get Lost in Deep Space: Understanding Quaternions, Mar. 10, 2017 https://www.allaboutcircuits.com/technical-articles/dont-get-lost-in-deep-space-understanding-quaternions (Year: 2017).

Kelly, An introduction to trajectory optimization: How to do your own direct collocation. SIAM Review. 2017;59 (4):849-904. 57 pages.

Kuindersma et al., Optimization-based locomotion planning, estimation, and control design for the atlas humanoid robot. Autonomous Robots. Mar. 2016;40(3):429-55.

Kuindersma, Scott, "Recent Progress on Atlas, The World's Most Dynamic Humanoid Robot", Boston Dynamics, video conference slides, Jun. 26, 2020, p. 1-22, https://www.youtube.com/watch?v=EGABAx52GKI.

Meuller, et al., "A Computationally Efficient Algorithm for State-to-State Quadrocopter Trajectory Generation and Feasibility Verification", 2013, IEEE/RSJ International Conference on Intelligent Robots and Systems (ROS), Nov. 3, 2013, pp. 3480-3486.

Orin et al., Centroidal dynamics of a humanoid robot. Autonomous Robots. Oct. 2013;35(2):161-76. 17 pages. doi:10.1007/s10514-013-9341-4.

Ponton et al, On time optimization of centroidal momentum dynamics. arXiv:1709.09265v3. Feb. 26, 2018. 7 pages.

Schiller, et al., "Suboptimal Nonlinear Moving Horizon Estimation", Arxiv. Org, Cornell University Library, 201 Olin. Library Cornell Library, Ithaca, NY 14853, Aug. 31, 2021, pp. 1-16.

Wanger, "More About Torque", https://www.rpi.edu/dept/phys/Dept2/APPhys1/torque/nod11.html (Year: 1999).

Wenger, et al., "A Global Analysis of Following Trajectories by Redundant Manipulators in the Presence of Obstacles", IEEE Comp. Soc. Press, US, vol. 3, Publication Date, May 2, 1993, pp. 901-906.

Zordan et al., Control of rotational dynamics for ground and aerial behavior. IEEE Transactions on Visualization and Computer Graphics. Oct. 2014. 12 pages.

International Search Report and Written Opinion of the International Searching Authority for International Application No. PCT/US2022/046526, dated Jan. 30, 2023.

International Search Report and Written Opinion of the International Searching Authority for International Application No. PCT/US2023/081276, dated Mar. 20, 2024.

Bratta, et al., "Governor: A Reference Generator for Nonlinear Model Predictive Control in Legged Robots", Arxiv. Org, Cornell University Library, 201 Olin Library Cornell University, Ithaca, NY, 14853 (Jul. 20, 2022) (9 pgs.).

Galliker, et al., "Planar Bipedal Locomotion with Nonlinear Model Predictive Control: Online Gait Generation Using Whole-Body Dynamics", 2022 IEEE-RAS 21st International Conference on Humanoid Robots (Humanoids), IEEE, (Nov. 28, 2022), pp. 622-629.

Sanghvi, "Recent Approach for Perceptive Legged Locomotion", Arxiv.Org., Cornell University Library, 201 Olin Library Cornell University, Ithaca, NY, 14853, (Sep. 21, 2022) (41 pgs.).

Sleiman, et al., "A Unified MPC Framework for Whole-Body Dynamic Locomotion and Manipulation", IEEE Robotics and Automation Letters., Preprinted Version Feb. 2021, pp. 1-8.

* cited by examiner

ROBOT MOVEMENT AND INTERACTION WITH MASSIVE BODIES

TECHNICAL FIELD

This disclosure relates generally to robotics and more specifically to systems, methods and apparatuses, including computer programs, for determining movements and/or trajectories of robotic devices.

BACKGROUND

Robotic devices are being developed for a variety of purposes today, such as to advance foundational research and to assist with missions that may be risky or taxing for humans to perform. Over time, robots have been tasked with traversing increasingly complicated environments, which may include difficult terrain, unforeseen obstacles, and/or unexpected changes in external conditions. To navigate such environments, robots can benefit from improved core agility and dynamic whole-body control schemes that take the robot's real world state and surroundings into account while economizing on the robot's computational resources.

SUMMARY

The present invention includes systems, methods and apparatuses, including computer programs, for determining movements and/or trajectories of robotic devices (e.g., desired in the future and/or commanded by the robotic device). A robot can interact with one or more massive bodies (e.g., perform a manipulation task on a rigid object) by accounting for one or more aspects of the coupled physical interaction (e.g., forces and/or motion constraints) between the robot and the one or more massive bodies. The robot can generate one or more feasible dynamics strategies (e.g., a trajectory reflecting movement of the robot) given one or more objectives at runtime (e.g., a goal state of the massive body, such as a desired pose of an articulated object).

For example, consider a humanoid robot that is tasked with carrying a heavy object (or load) from a starting location to a destination location. To successfully lift and place the heavy object, the robot can anticipate and/or model the loading and/or unloading motions such that the robot maintains balance while: (i) preparing to lift the heavy object from the starting location; (ii) holding the heavy object; (iii) moving with the heavy object; and/or (iv) placing the heavy object down in the destination location.

In some embodiments, controlling the inertial forces acting on the robot due to the object (and/or the composite inertia of the coupled robot/object system) can be helpful during locomotion. In some embodiments, the robot can optimize dynamic objectives subject to one or more kinematic constraints (e.g., imposed by the robot's hardware limitations and/or the laws of physics) to meet runtime task-specific objectives (e.g., placing the object on a high surface). In some embodiments, when movements do not go as planned, the robot can leverage its entire body (and/or any objects with which it is interacting) to improve balance and/or manipulation (e.g., the robot can "windmill" its arms and/or use object inertia to maintain balance).

In some embodiments, a robot can be provided with a library of trajectories that correspond to one or more "template behaviors", such as running, walking, jumping, hopping, or other movements. The trajectories can be pre-computed (e.g., while the robot is "offline") and stored in memory accessible to the robot. During operation (e.g., while the robot is "online"), the robot can select one or more trajectories and combine them with other information received in real-time, such as information regarding the robot's kinematic state and/or information about the robot's environment (e.g., as perceived and/or processed by the robot). These inputs can be used to determine one or more "reference trajectories," which can be further processed to produce a set of movement parameters that allow the robot to move about and/or interact with its environment.

In some embodiments, a robot can use a set of reusable computing modules for performing the above operations, e.g., one module for generating a reference trajectory for the robot, another module for determining a set of motion parameters for the robot, and another module for determining a set of inputs to the robot's joint servo controllers consistent with the set of motion parameters. In some embodiments, the robot can generate suitable behaviors automatically based upon information received from a perception module (e.g., the perception module can provide and/or calculate touch-down targets based on identified planar regions) and/or a kinematic state estimation module.

The systems and methods described herein can be extended beyond single behaviors to achieve a fluid sequence of multiple blended behaviors. For example, the robot can populate a queue of multiple behaviors, and its computing architecture can create smooth connections between behaviors in the queue, blending them to create fluid motions (e.g., "concatenating" multiple trajectory pieces to form a larger, fluid trajectory). For example, the landing stage of one jump or step can blend into the take-off stage of another jump or step (rather than, for example, executing both in succession with a full stop in between, which may appear less natural and/or be less energy efficient). In some embodiments, the queue of behaviors can be populated automatically based on information sensed from the environment (e.g., moves can be planned, chosen, and/or strung together by a perception module of the robot or a separate module in electronic communication with the perception module). In some embodiments, one or more post-processing operations can be applied to the concatenated trajectory pieces (e.g., corresponding to a sequence of modifications of the base trajectories). For example, a post-processing operation can include overriding one or more reference joint-space arm trajectories (contained in trajectory pieces from the library of trajectories) with reference Cartesian-space hand trajectories needed to pick up an object (and/or reference trajectories for the object itself once the robot has grasped the object). In some embodiments, the robot can keep choosing moves until an entire user-specified mission is performed, extending the autonomous capabilities of the robot and further increasing its real-world usefulness.

Another set of systems and methods related to determining robot trajectories is described in U.S. patent application Ser. No. 17/358,628, titled "Robot Movement and Online Trajectory Optimization," the content of which is hereby incorporated by reference in its entirety. Such systems and methods can utilize some of the same operating principles as those disclosed herein, but those disclosed herein may include additional capabilities as well. For example, the systems and methods disclosed herein can actively model dynamic massive bodies interacting with the robot. In addition, the systems and methods described herein can determine a set of movement parameters without computing separate centroidal and kinematic trajectories. Moreover, the systems and methods described herein do not need to rely as heavily on trajectories computed offline, but have an increased capacity to adapt and/or innovate whole-body motions in the online phase.

In one aspect, the invention features a computer-implemented method. The method includes receiving, by a computing system of a robot, information comprising a reference behavior specification, a current state of the robot, and a characteristic of one or more massive bodies coupled to or expected to be coupled to the robot, determining, by the computing system, based on the information, a set of movement parameters for the robot, the set of movement parameters reflecting a goal trajectory for the robot, and instructing, by the computing system, the robot to move consistent with the set of movement parameters.

In some embodiments, the method further comprises determining a reference trajectory for the robot, wherein determining the set of movement parameters for the robot is based on the reference trajectory.

In some embodiments, the reference behavior specification comprises at least one of (i) a target spatial region for at least a portion of the robot to occupy, or (ii) a target spatial region for at least a portion of at least one of the one or more massive bodies to occupy.

In some embodiments, the current state of the robot comprises one or more parameters reflecting at least a current position and a current velocity of the robot.

In some embodiments, the characteristic of the one or more massive bodies comprises at least one of a linear dimension, a mass, a volume, or an inertial distribution.

In some embodiments, the set of movement parameters for the robot comprises one or more wrenches.

In some embodiments, the method further comprises computing, based on the set of movement parameters, a joint torque for each of one or more joints of the robot, and wherein instructing the robot to move consistent with the set of movement parameters comprises instructing the robot based, at least in part, on the joint torques.

In some embodiments, the method further comprises determining, based on the set of movement parameters, a set of actuator inputs for execution on the robot, and instructing the robot to move consistent with the set of movement parameters comprises instructing the robot based, at least in part, on the set of actuator inputs.

In some embodiments, the goal trajectory for the robot is determined based on a runtime objective. In some embodiments, the goal trajectory for the robot is determined based on a goal state for the one or more massive bodies. In some embodiments, the massive body is coupled to the robot. In some embodiments, the massive body is expected to be coupled to the robot. In some embodiments, the massive body is a rigid body.

In some embodiments, the characteristic of the massive body is sensed by the robot based on at least one of (i) a force sensed by the robot, (ii) a torque about a joint of the robot sensed by the robot, (iii) an image sensed by the robot, (iv) an object classification algorithm included on the robot, or (v) input by an operator of the robot.

In some embodiments, the goal trajectory reflects the robot performing at least one manipulation task. In some embodiments, the at least one manipulation task comprises carrying, pushing, pulling, throwing, or holding the massive body.

In some embodiments, the method further comprises determining the goal trajectory by (i) determining a first trajectory; (ii) determining a second trajectory; and (iii) concatenating the first trajectory with the second trajectory to produce a concatenated trajectory as the goal trajectory.

In some embodiments, the goal trajectory reflects at least one motion constraint based on an internal limitation of the robot, a limitation imposed on the robot by the massive body, or an expected collision of the robot.

In some embodiments, the goal trajectory accounts for at least one runtime objective. In some embodiments, the goal trajectory comprises an SE(3) pose of at least one link of the robot.

In some embodiments, instructing the robot to move is based on a composite characteristic of the robot and the massive body.

In some embodiments, the goal trajectory is determined for a time horizon of at least one second. In some embodiments, the goal trajectory is determined based on perception data from the robot.

In some embodiments, the robot is a biped robot. In some embodiments, the massive body is coupled to the robot using an end effector of the robot.

In one aspect, the invention features a computing system of a robot. The computing system comprises data processing hardware, and memory hardware in communication with the data processing hardware. The memory hardware is configured to store instructions that when executed on the data processing hardware cause the data processing hardware to perform operations. The operations include receiving information comprising a reference behavior specification, a current state of the robot, and a characteristic of one or more massive bodies coupled to or expected to be coupled to the robot, determining, based on the information, a set of movement parameters for the robot, the set of movement parameters reflecting a goal trajectory for the robot, and instructing the robot to move consistent with the set of movement parameters.

In some embodiments, the operations further include determining a reference trajectory for the robot, wherein determining the set of movement parameters for the robot is based on the reference trajectory.

In some embodiments, the reference behavior specification comprises at least one of (i) a target spatial region for at least a portion of the robot to occupy, or (ii) a target spatial region for at least a portion of at least one of the one or more massive bodies to occupy.

In some embodiments, the current state of the robot comprises one or more parameters reflecting at least a current position and a current velocity of the robot.

In some embodiments, the characteristic of the one or more massive bodies comprises at least one of a linear dimension, a mass, a volume, or an inertial distribution.

In some embodiments, the set of movement parameters for the robot comprises one or more wrenches.

In some embodiments, the operations further include computing, based on the set of movement parameters, a joint torque for each of one or more joints of the robot, and wherein instructing the robot to move consistent with the set of movement parameters comprises instructing the robot based, at least in part, on the joint torques.

In some embodiments, the operations further include determining, based on the set of movement parameters, a set of actuator inputs for execution on the robot, and wherein instructing the robot to move consistent with the set of movement parameters comprises instructing the robot based, at least in part, on the set of actuator inputs.

In some embodiments, the goal trajectory for the robot is determined based on a runtime objective. In some embodiments, the goal trajectory for the robot is determined based on a goal state for the one or more massive bodies. In some embodiments, the massive body is coupled to the robot. In some embodiments, the massive body is expected to be coupled to the robot. In some embodiments, the massive body is a rigid body.

In some embodiments, the characteristic of the massive body is sensed by the robot based on at least one of (i) a force sensed by the robot, (ii) a torque about a joint of the robot sensed by the robot, (iii) an image sensed by the robot, (iv) an object classification algorithm included on the robot, or (v) input by an operator of the robot.

In some embodiments, the goal trajectory reflects the robot performing at least one manipulation task. In some embodiments, the at least one manipulation task comprises carrying, pushing, pulling, throwing, or holding the massive body.

In some embodiments, the operations further include determining the goal trajectory by (i) determining a first trajectory; (ii) determining a second trajectory; and (iii) concatenating the first trajectory with the second trajectory to produce a concatenated trajectory as the goal trajectory.

In some embodiments, the goal trajectory reflects at least one motion constraint based on an internal limitation of the robot, a limitation imposed on the robot by the massive body, or an expected collision of the robot.

In some embodiments, the goal trajectory accounts for at least one runtime objective. In some embodiments, the goal trajectory comprises an SE(3) pose of at least one link of the robot.

In some embodiments, instructing the robot to move is based on a composite characteristic of the robot and the massive body.

In some embodiments, the goal trajectory is determined for a time horizon of at least one second. In some embodiments, the goal trajectory is determined based on perception data from the robot. In some embodiments, the robot is a biped robot. In some embodiments, the massive body is coupled to the robot using an end effector of the robot.

BRIEF DESCRIPTION OF DRAWINGS

The advantages of the invention, together with further advantages, may be better understood by referring to the following description taken in conjunction with the accompanying drawings. The drawings are not necessarily to scale, and emphasis is instead generally placed upon illustrating the principles of the invention.

DETAILED DESCRIPTION

Figure 1:
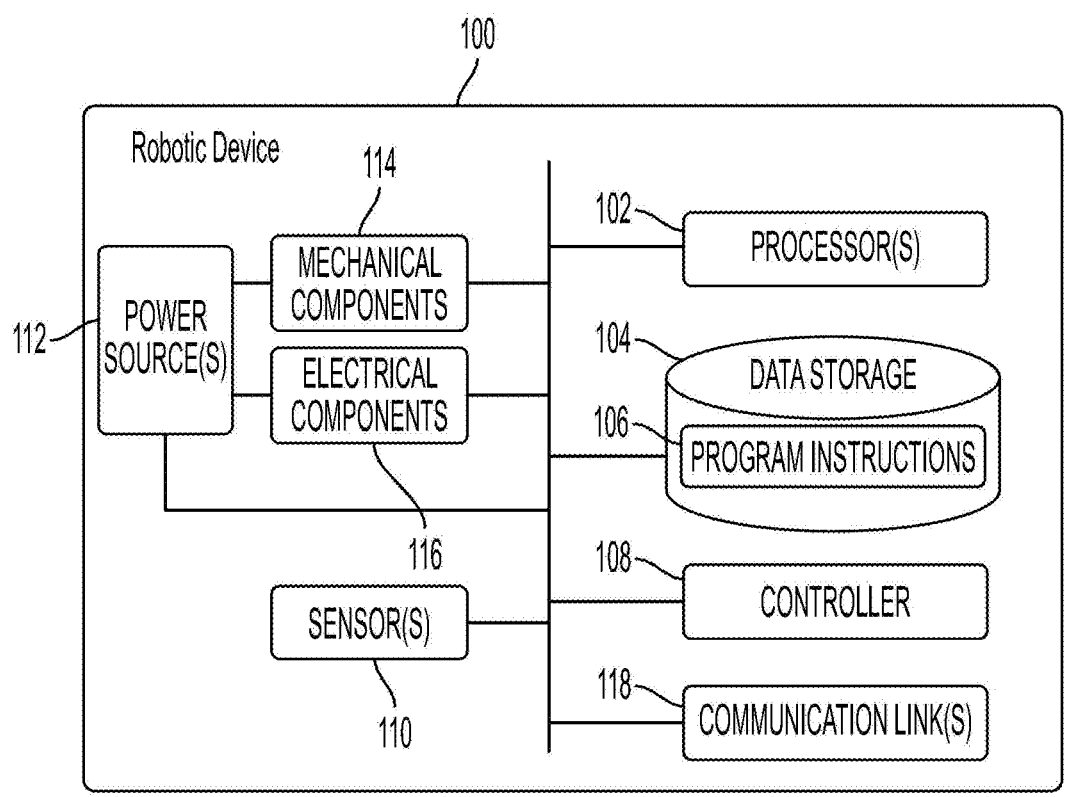
FIG. 1 illustrates an example configuration of a robotic device, according to an illustrative embodiment of the invention.

An example implementation involves a robotic device configured with at least one robotic limb, one or more sensors, and a processing system. The robotic limb may be an articulated robotic appendage including a number of members connected by joints. The robotic limb may also include a number of actuators (e.g., 2-5 actuators) coupled to the members of the limb that facilitate movement of the robotic limb through a range of motion limited by the joints connecting the members. The sensors may be configured to measure properties of the robotic device, such as angles of the joints, pressures within the actuators, joint torques, and/or positions, velocities, and/or accelerations of members of the robotic limb(s) at a given point in time. The sensors may also be configured to measure an orientation (e.g., a body orientation measurement) of the body of the robotic device (which may also be referred to herein as the "base" of the robotic device). Other example properties include the masses of various components of the robotic device, among other properties. The processing system of the robotic device may determine the angles of the joints of the robotic limb, either directly from angle sensor information or indirectly from other sensor information from which the joint angles can be calculated. The processing system may then estimate an orientation of the robotic device based on the sensed orientation of the base of the robotic device and the joint angles.

An orientation may herein refer to an angular position of an object. In some instances, an orientation may refer to an amount of rotation (e.g., in degrees or radians) about three axes. In some cases, an orientation of a robotic device may refer to the orientation of the robotic device with respect to a particular reference frame, such as the ground or a surface on which it stands. An orientation may describe the angular position using Euler angles, Tait-Bryan angles (also known as yaw, pitch, and roll angles), and/or Quaternions. In some instances, such as on a computer-readable medium, the orientation may be represented by an orientation matrix and/or an orientation quaternion, among other representations.

In some scenarios, measurements from sensors on the base of the robotic device may indicate that the robotic device is oriented in such a way and/or has a linear and/or angular velocity that requires control of one or more of the articulated appendages in order to maintain balance of the robotic device. In these scenarios, however, it may be the case that the limbs of the robotic device are oriented and/or moving such that balance control is not required. For example, the body of the robotic device may be tilted to the left, and sensors measuring the body's orientation may thus indicate a need to move limbs to balance the robotic device; however, one or more limbs of the robotic device may be extended to the right, causing the robotic device to be balanced despite the sensors on the base of the robotic device indicating otherwise. The limbs of a robotic device may apply a torque on the body of the robotic device and may also affect the robotic device's center of mass. Thus, orientation and angular velocity measurements of one portion of the robotic device may be an inaccurate representation of the orientation and angular velocity of the combination of the robotic device's body and limbs (which may be referred to herein as the "aggregate" orientation and angular velocity).

In some implementations, the processing system may be configured to estimate the aggregate orientation and/or angular velocity of the entire robotic device based on the sensed orientation of the base of the robotic device and the measured joint angles. The processing system has stored thereon a relationship between the joint angles of the robotic device and the extent to which the joint angles of the robotic device affect the orientation and/or angular velocity of the base of the robotic device. The relationship between the joint angles of the robotic device and the motion of the base of the robotic device may be determined based on the kinematics and mass properties of the limbs of the robotic devices. In other words, the relationship may specify the effects that the joint angles have on the aggregate orientation and/or angular velocity of the robotic device. Additionally, the processing system may be configured to determine components of the orientation and/or angular velocity of the robotic device caused by internal motion and components of the orientation and/or angular velocity of the robotic device caused by external motion. Further, the processing system may differentiate components of the aggregate orientation in order to determine the robotic device's aggregate yaw rate, pitch rate, and roll rate (which may be collectively referred to as the "aggregate angular velocity").

In some implementations, the robotic device may also include a control system that is configured to control the robotic device on the basis of a simplified model of the robotic device. The control system may be configured to receive the estimated aggregate orientation and/or angular velocity of the robotic device, and subsequently control one or more jointed limbs of the robotic device to behave in a certain manner (e.g., maintain the balance of the robotic device). For instance, the control system may determine locations at which to place the robotic device's feet and/or the force to exert by the robotic device's feet on a surface based on the aggregate orientation.

In some implementations, the robotic device may include force sensors that measure or estimate the external forces (e.g., the force applied by a leg of the robotic device against the ground) along with kinematic sensors to measure the orientation of the limbs of the robotic device. The processing system may be configured to determine the robotic device's angular momentum based on information measured by the sensors. The control system may be configured with a feedback-based state observer that receives the measured angular momentum and the aggregate angular velocity, and provides a reduced-noise estimate of the angular momentum of the robotic device. The state observer may also receive measurements and/or estimates of torques or forces acting on the robotic device and use them, among other information, as a basis to determine the reduced-noise estimate of the angular momentum of the robotic device.

The control system may be configured to actuate one or more actuators connected across components of a robotic leg. The actuators may be controlled to raise or lower the robotic leg. In some cases, a robotic leg may include actuators to control the robotic leg's motion in three dimensions. Depending on the particular implementation, the control system may be configured to use the aggregate orientation, along with other sensor measurements, as a basis to control the robot in a certain manner (e.g., stationary balancing, walking, running, galloping, etc.).

In some implementations, multiple relationships between the joint angles and their effect on the orientation and/or angular velocity of the base of the robotic device may be stored on the processing system. The processing system may select a particular relationship with which to determine the aggregate orientation and/or angular velocity based on the joint angles. For example, one relationship may be associated with a particular joint being between 0 and 90 degrees, and another relationship may be associated with the particular joint being between 91 and 180 degrees. The selected relationship may more accurately estimate the aggregate orientation of the robotic device than the other relationships.

In some implementations, the processing system may have stored thereon more than one relationship between the joint angles of the robotic device and the extent to which the joint angles of the robotic device affect the orientation and/or angular velocity of the base of the robotic device. Each relationship may correspond to one or more ranges of joint angle values (e.g., operating ranges). In some implementations, the robotic device may operate in one or more modes. A mode of operation may correspond to one or more of the joint angles being within a corresponding set of operating ranges. In these implementations, each mode of operation may correspond to a certain relationship.

The angular velocity of the robotic device may have multiple components describing the robotic device's orientation (e.g., rotational angles) along multiple planes. From the perspective of the robotic device, a rotational angle of the robotic device turned to the left or the right may be referred to herein as "yaw." A rotational angle of the robotic device upwards or downwards may be referred to herein as "pitch." A rotational angle of the robotic device tilted to the left or the right may be referred to herein as "roll." Additionally, the rate of change of the yaw, pitch, and roll may be referred to herein as the "yaw rate," the "pitch rate," and the "roll rate," respectively.

Referring now to the figures, FIG. 1 illustrates an example configuration of a robotic device (or "robot") 100, according to an illustrative embodiment of the invention. The robotic device 100 represents an example robotic device configured to perform the operations described herein. Additionally, the robotic device 100 may be configured to operate autonomously, semi-autonomously, and/or using directions provided by user(s), and may exist in various forms, such as a humanoid robot, biped, quadruped, or other mobile robot, among other examples. Furthermore, the robotic device 100 may also be referred to as a robotic system, mobile robot, or robot, among other designations.

As shown in FIG. 1, the robotic device 100 includes processor(s) 102, data storage 104, program instructions 106, controller 108, sensor(s) 110, power source(s) 112, mechanical components 114, and electrical components 116. The robotic device 100 is shown for illustration purposes and may include more or fewer components without departing from the scope of the disclosure herein. The various components of robotic device 100 may be connected in any manner, including via electronic communication means, e.g., wired or wireless connections. Further, in some examples, components of the robotic device 100 may be positioned on multiple distinct physical entities rather on a single physical entity. Other example illustrations of robotic device 100 may exist as well.

Processor(s) 102 may operate as one or more general-purpose processor or special purpose processors (e.g., digital signal processors, application specific integrated circuits, etc.). The processor(s) 102 can be configured to execute computer-readable program instructions 106 that are stored in the data storage 104 and are executable to provide the operations of the robotic device 100 described herein. For instance, the program instructions 106 may be executable to provide operations of controller 108, where the controller 108 may be configured to cause activation and/or deactivation of the mechanical components 114 and the electrical components 116. The processor(s) 102 may operate and enable the robotic device 100 to perform various functions, including the functions described herein.

The data storage 104 may exist as various types of storage media, such as a memory. For example, the data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices, which may communicate electronically (e.g., via wired or wireless communication). Further, in addition to the computer-readable program instructions 106, the data storage 104 may include additional data such as diagnostic data, among other possibilities.

The robotic device 100 may include at least one controller 108, which may interface with the robotic device 100. The controller 108 may serve as a link between portions of the robotic device 100, such as a link between mechanical components 114 and/or electrical components 116. In some instances, the controller 108 may serve as an interface between the robotic device 100 and another computing device. Furthermore, the controller 108 may serve as an interface between the robotic system 100 and a user(s). The controller 108 may include various components for communicating with the robotic device 100, including one or more joysticks or buttons, among other features. The controller 108 may perform other operations for the robotic device 100 as well. Other examples of controllers may exist as well.

Additionally, the robotic device 100 includes one or more sensor(s) 110 such as force sensors, proximity sensors, motion sensors, load sensors, position sensors, touch sensors, depth sensors, ultrasonic range sensors, and/or infrared sensors, among other possibilities. The sensor(s) 110 may provide sensor data to the processor(s) 102 to allow for appropriate interaction of the robotic system 100 with the environment as well as monitoring of operation of the systems of the robotic device 100. The sensor data may be used in evaluation of various factors for activation and deactivation of mechanical components 114 and electrical components 116 by controller 108 and/or a computing system of the robotic device 100.

The sensor(s) 110 may provide information indicative of the environment of the robotic device for the controller 108 and/or computing system to use to determine operations for the robotic device 100. For example, the sensor(s) 110 may capture data corresponding to the terrain of the environment or location of nearby objects, which may assist with environment recognition and navigation, etc. In an example configuration, the robotic device 100 may include a sensor system that may include a camera, RADAR, LIDAR, time-of-flight camera, global positioning system (GPS) transceiver, and/or other sensors for capturing information of the environment of the robotic device 100. The sensor(s) 110 may monitor the environment in real-time and detect obstacles, elements of the terrain, weather conditions, temperature, and/or other parameters of the environment for the robotic device 100.

Further, the robotic device 100 may include other sensor(s) 110 configured to receive information indicative of the state of the robotic device 100, including sensor(s) 110 that may monitor the state of the various components of the robotic device 100. The sensor(s) 110 may measure activity of systems of the robotic device 100 and receive information based on the operation of the various features of the robotic device 100, such the operation of extendable legs, arms, or other mechanical and/or electrical features of the robotic device 100. The sensor data provided by the sensors may enable the computing system of the robotic device 100 to determine errors in operation as well as monitor overall functioning of components of the robotic device 100.

For example, the computing system may use sensor data to determine the stability of the robotic device 100 during operations as well as measurements related to power levels, communication activities, components that require repair, among other information. As an example configuration, the robotic device 100 may include gyroscope(s), accelerometer(s), and/or other possible sensors to provide sensor data relating to the state of operation of the robotic device. Further, sensor(s) 110 may also monitor the current state of a function, such as a gait, that the robotic system 100 may currently be operating. Additionally, the sensor(s) 110 may measure a distance between a given robotic leg of a robotic device and a center of mass of the robotic device. Other example uses for the sensor(s) 110 may exist as well.

Additionally, the robotic device 100 may also include one or more power source(s) 112 configured to supply power to various components of the robotic device 100. Among possible power systems, the robotic device 100 may include a hydraulic system, electrical system, batteries, and/or other types of power systems. As an example illustration, the robotic device 100 may include one or more batteries configured to provide power to components via a wired and/or wireless connection. Within examples, components of the mechanical components 114 and electrical components 116 may each connect to a different power source or may be powered by the same power source. Components of the robotic system 100 may connect to multiple power sources as well.

Within example configurations, any type of power source may be used to power the robotic device 100, such as a gasoline and/or electric engine. Further, the power source(s) 112 may charge using various types of charging, such as wired connections to an outside power source, wireless charging, combustion, or other examples. Other configurations may also be possible. Additionally, the robotic device 100 may include a hydraulic system configured to provide power to the mechanical components 114 using fluid power. Components of the robotic device 100 may operate based on hydraulic fluid being transmitted throughout the hydraulic system to various hydraulic motors and hydraulic cylinders, for example. The hydraulic system of the robotic device 100 may transfer a large amount of power through small tubes, flexible hoses, or other links between components of the robotic device 100. Other power sources may be included within the robotic device 100.

Mechanical components 114 can represent hardware of the robotic system 100 that may enable the robotic device 100 to operate and perform physical functions. As a few examples, the robotic device 100 may include actuator(s), extendable leg(s) ("legs"), arm(s), wheel(s), one or multiple structured bodies for housing the computing system or other components, and/or other mechanical components. The mechanical components 114 may depend on the design of the robotic device 100 and may also be based on the functions and/or tasks the robotic device 100 may be configured to perform. As such, depending on the operation and functions of the robotic device 100, different mechanical components 114 may be available for the robotic device 100 to utilize. In some examples, the robotic device 100 may be configured to add and/or remove mechanical components 114, which may involve assistance from a user and/or other robotic device. For example, the robotic device 100 may be initially configured with four legs, but may be altered by a user or the robotic device 100 to remove two of the four legs to operate as a biped. Other examples of mechanical components 114 may be included.

The electrical components 116 may include various components capable of processing, transferring, providing electrical charge or electric signals, for example. Among possible examples, the electrical components 116 may include electrical wires, circuitry, and/or wireless communication transmitters and receivers to enable operations of the robotic device 100. The electrical components 116 may interwork with the mechanical components 114 to enable the robotic device 100 to perform various operations. The electrical components 116 may be configured to provide power from the power source(s) 112 to the various mechanical components 114, for example. Further, the robotic device 100 may include electric motors. Other examples of electrical components 116 may exist as well.

In some implementations, the robotic device 100 may also include communication link(s) 118 configured to send and/or receive information. The communication link(s) 118 may transmit data indicating the state of the various components of the robotic device 100. For example, information read in by sensor(s) 110 may be transmitted via the communication link(s) 118 to a separate device. Other diagnostic information indicating the integrity or health of the power source(s) 112, mechanical components 114, electrical components 118, processor(s) 102, data storage 104, and/or controller 108 may be transmitted via the communication link(s) 118 to an external communication device.

In some implementations, the robotic device 100 may receive information at the communication link(s) 118 that is processed by the processor(s) 102. The received information may indicate data that is accessible by the processor(s) 102 during execution of the program instructions 106, for example. Further, the received information may change aspects of the controller 108 that may affect the behavior of the mechanical components 114 or the electrical components 116. In some cases, the received information indicates a query requesting a particular piece of information (e.g., the operational state of one or more of the components of the robotic device 100), and the processor(s) 102 may subsequently transmit that particular piece of information back out the communication link(s) 118.

In some cases, the communication link(s) 118 include a wired connection. The robotic device 100 may include one or more ports to interface the communication link(s) 118 to an external device. The communication link(s) 118 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, radio, Bluetooth, or a near-field communication (NFC) device.

Figure 2:
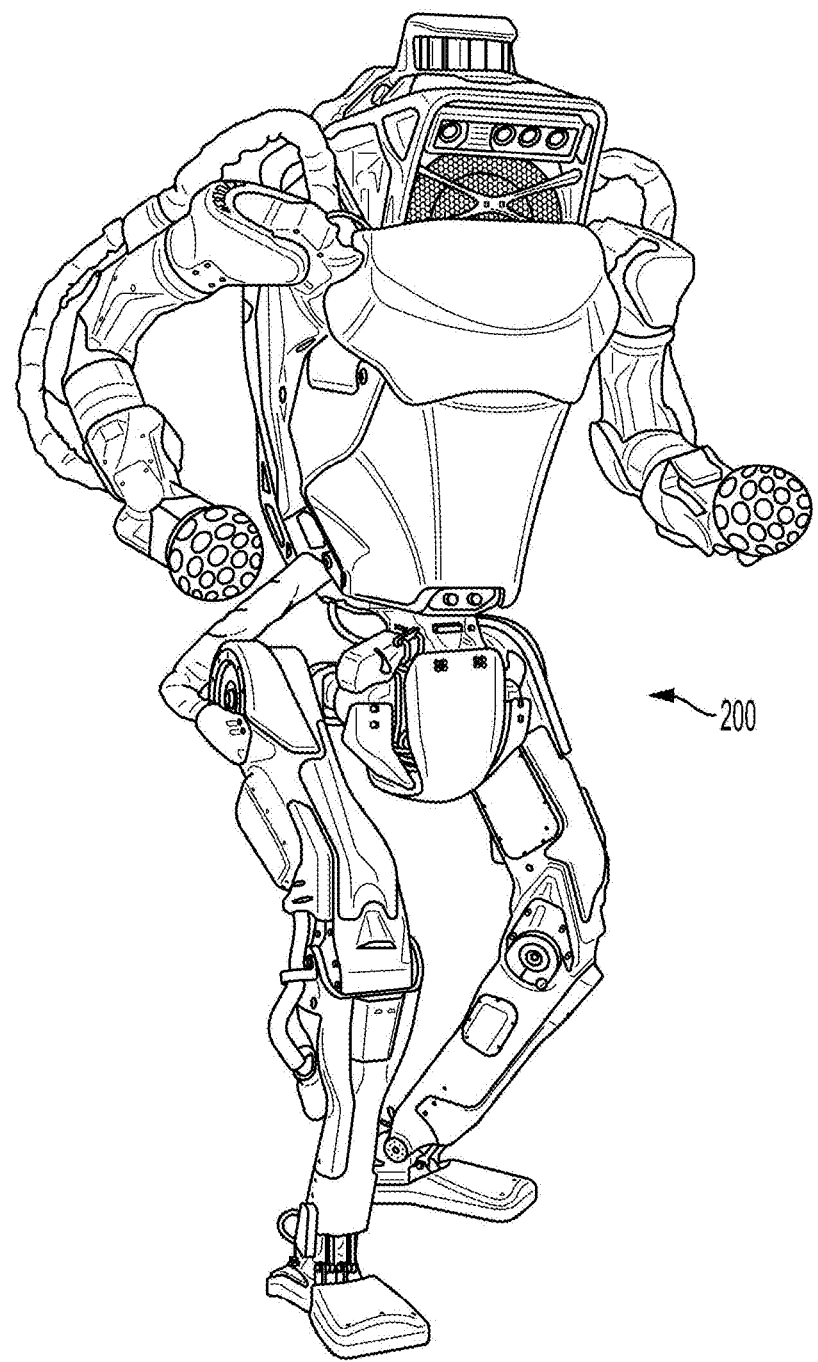
FIG. 2 illustrates an example of a humanoid robot, according to an illustrative embodiment of the invention.

FIG. 2 illustrates an example of a humanoid robot, according to an illustrative embodiment of the invention. The robotic device 200 may correspond to the robotic device 100 shown in FIG. 1. The robotic device 200 serves as a possible implementation of a robotic device that may be configured to include the systems and/or carry out the methods described herein. Other example implementations of robotic devices may exist.

The robotic device 200 may include a number of articulated appendages, such as robotic legs and/or robotic arms. Each articulated appendage may include a number of members connected by joints that allow the articulated appendage to move through certain degrees of freedom. Each member of an articulated appendage may have properties describing aspects of the member, such as its weight, weight distribution, length, and/or shape, among other properties. Similarly, each joint connecting the members of an articulated appendage may have known properties, such as the degrees of its range of motion the joint allows, the size of the joint, and the distance between members connected by the joint, among other properties. A given joint may be a joint allowing one degree of freedom (e.g., a knuckle joint or a hinge joint), a joint allowing two degrees of freedom (e.g., a cylindrical joint), a joint allowing three degrees of freedom (e.g., a ball and socket joint), or a joint allowing four or more degrees of freedom. A degree of freedom may refer to the ability of a member connected to a joint to move about a particular translational or rotational axis.

The robotic device 200 may also include sensors to measure the angles of the joints of its articulated appendages. In addition, the articulated appendages may include a number of actuators that can be controlled to extend and retract members of the articulated appendages. In some cases, the angle of a joint may be determined based on the extent of protrusion or retraction of a given actuator. In some instances, the joint angles may be inferred from position data of inertial measurement units (IMUs) mounted on the members of an articulated appendage. In some implementations, the joint angles may be measured using rotary position sensors, such as rotary encoders. In other implementations, the joint angles may be measured using optical reflection techniques. Other joint angle measurement techniques may also be used.

The robotic device 200 may be configured to send sensor data from the articulated appendages to a device coupled to the robotic device 200 such as a processing system, a computing system, or a control system. The robotic device 200 may include a memory, either included in a device on the robotic device 200 or as a standalone component, on which sensor data is stored. In some implementations, the sensor data is retained in the memory for a certain amount of time. In some cases, the stored sensor data may be processed or otherwise transformed for use by a control system on the robotic device 200. In some cases, the robotic device 200 may also transmit the sensor data over a wired or wireless connection (or other electronic communication means) to an external device.

Figure 3A:
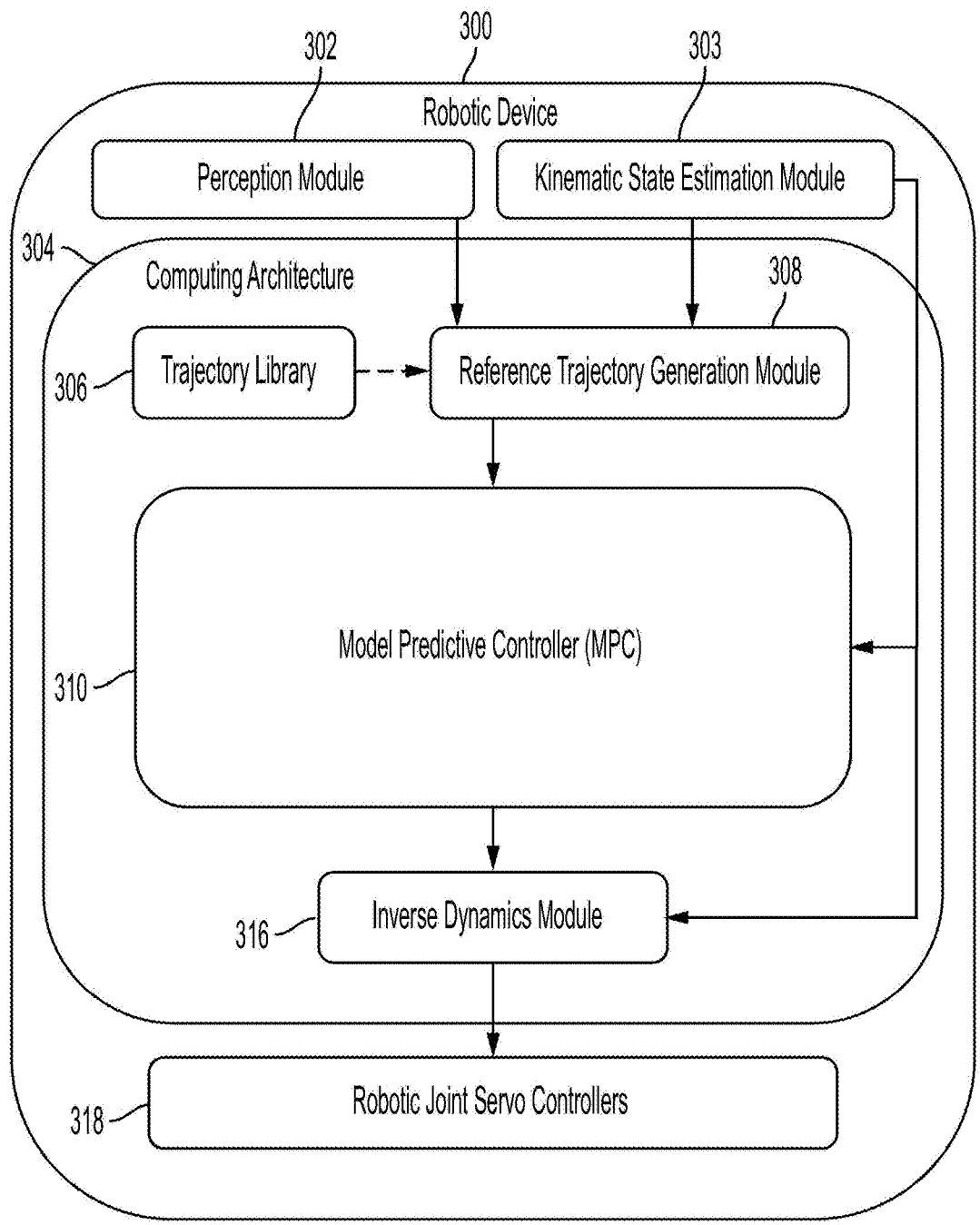
FIG. 3A illustrates an example computing architecture for a robotic device, according to an illustrative embodiment of the invention.

FIG. 3A illustrates an example computing architecture 304 for a robotic device 300, according to an illustrative embodiment of the invention. The computing architecture 304 includes a reference trajectory generation module 308, a model predictive controller (MPC) 310, and an inverse dynamics module 316. The computing architecture 304 can also include additional elements, such as a trajectory library 306. In addition to the computing architecture 304, the robotic device 300 can include a perception module 302, a kinematic state estimation module 303, and/or one or more robotic joint servo controllers 318. One having ordinary skill in the art will appreciate that the setup shown in FIG. 3A is exemplary, and other modules and/or configurations are also possible.

The perception module 302 can perceive one or more aspects of the environment of the robotic device 300 and/or provide input reflecting the environment to the computing architecture 304. For example, the perception module 302 can sense the environment using a depth camera, a LIDAR or stereo vision device, or another piece of equipment with suitable sensory capabilities. In some embodiments, the perception module 302 can perform tasks such as extracting local planar regions (e.g., using one or more plane fitting algorithms) to determine suitable surfaces for the robotic device 300 to traverse and/or obstacles for the robotic device 300 to avoid. In some embodiments, the perception module 302 can use a planner (e.g., a heuristic planner) to determine touchdown locations for the robotic device 300 on the identified planar regions. In some embodiments, input provided by the perception module 302 can also be provided via other means (e.g., the environment can be programmed with a map, or a user can input other specifications in any suitable way).

The reference trajectory generation module 308 can receive input (e.g., behavior commands for the robotic device 300). For example, in some embodiments such input can take the form of one or more entries (e.g., trajectory targets) from a trajectory library (e.g., trajectory library 306), one or more navigation targets for the robotic device 300 (e.g., one or more touchdown locations for one or more feet of the robotic device 300), one or more characteristics of one or more massive bodies coupled to the robotic device 300 (or expected to be coupled to the robotic device 300), and/or one or more reference behavior specifications (e.g., a location to which the robotic device 300 is to move an articulated object). In some embodiments, the input received by the reference trajectory generation module 308 may be received from the perception module 302. In some embodiments, the trajectory target(s) can be determined automatically (e.g., by or in coordination with the perception module 302) based upon the task to be achieved. In some embodiments, the trajectory target(s) can be specified manually by an operator. In some embodiments, the trajectory target(s) takes the form of a desired SE(3) pose for one or more robot links, such as foot locations at touchdown. The reference trajectory generation module 308 can also receive a kinematic state of the robotic device 300 from the kinematic state estimation module 303. In some embodiments, the kinematic state comprises a vector including joint positions, velocities, angular orientations, and/or angular velocities (e.g., a twist). In some embodiments, the kinematic state estimation module 303 can estimate the present kinematic state of the robotic device 300 (e.g., by combining measured position, velocity, acceleration, and/or force signals of the robotic device 300).

Using one or more of the above inputs, the reference trajectory generation module 308 can determine a reference trajectory for the robotic device 300. In some embodiments, the reference trajectory can be similar to an entry from the trajectory library 306 in format but can include notable differences. For example, one or more numerical values may differ between the reference trajectory and the trajectory library entry to account for perceived environmental obstacles, local environmental geometric constraints, unexpected variations in kinematic state, an interaction (or expected interaction) with one or more massive bodies, or other variables. In some embodiments, the reference trajectory may represent a spatially warped version of an entry from the trajectory library 306. In some embodiments, the reference trajectory generation module 308 outputs numerical information specifying joint positions, velocities, and/or accelerations for one or more joints of the robotic device 300 as functions of time. In some embodiments, the numerical information takes the form of a cubic polynomial function for each robot joint, e.g., reflecting a position and a velocity for each joint as a function of time. In some embodiments, the reference trajectory includes information about the timing and/or location of contact events between one or more robot links and the environment. It should be appreciated that in some embodiments, the reference trajectory generation module 308 can determine a reference trajectory for the robotic device 300 without accessing or otherwise receiving information from trajectory library 306. For instance, the reference trajectory generator 308 may generate a reference trajectory that transitions smoothly from one desired standing posture of the robot 300 to another posture of the robot (e.g., without taking a step), e.g., to bend over and look at the feet of the robot 300. In some embodiments, the reference trajectory generator 308 can generate trackable reference trajectories (e.g., a walking reference trajectory) for the robot 300 based on input specifying only a final desired stance location (e.g., without using one or more entries from trajectory library 306).

The reference trajectory can be provided as input to the MPC 310. The MPC 310 can compute one or more movement parameters for the robotic device 300 over a specified time horizon (e.g., 1 second or longer). In some embodiments, the movement parameters include instantaneous desired robot motion and/or expected forces acting on the robotic device 300. In some embodiments, the movement parameters include a trajectory of contact wrenches applied at one or more links of the robotic device 300. In some embodiments, the MPC 310 defines an optimization problem, which it solves to determine a goal trajectory for the robotic device 300 (e.g., a plan for the robotic device 300 to move from a current state of the robotic device 300 to a goal state of the robotic device 300). In some embodiments, the optimization problem takes into account one or more constraints (e.g., reflecting the laws of physics and/or the robot's internal hardware limitations) and/or objectives (e.g., a placement location for an articulated object, a particular orientation in which the robotic device 300 should land, and/or a certain degree of smoothness of motion) to find an optimal solution to the optimization problem. Further details of an exemplary MPC 310 are shown and described below in FIG. 3B.

The inverse dynamics module 316 can receive input from the MPC 310 and output a reference joint position and/or torque for each of the robotic joint servo controllers 318, which can be provided to actuators of the robotic device 300 to enable the robotic device 300 to execute its planned movement. In some embodiments, the inverse dynamics module 316 can track a desired wrench of the robotic device 300 as closely as possible or desired in a given situation. In some embodiments, the inverse dynamics module 316 can map a desired robot pose and/or one or more external wrenches to joint torques. In some embodiments, the MPC 310 (e.g., using the MPC Solution Interpolation Module 348 shown and described below in FIG. 3B) interpolates into one or more solution trajectories to output one or more desired joint positions, desired joint velocities, and/or feed-forward joint accelerations at a specified time.

In some embodiments, one or more predetermined joint positions and/or joint velocity inputs, along with one or more target joint accelerations and/or externally applied wrench inputs, are mapped to one or more desired joint accelerations, externally applied wrenches, and/or achievable joint torques (e.g., by solving a quadratic program). In some embodiments, one or more target joint acceleration inputs are determined from one or more desired joint positions, desired joint velocities, current estimated joint positions, current estimated joint velocities, and/or feed-forward joint accelerations (e.g., using a proportional-derivative control law). In some embodiments, one or more reference joint positions (and/or velocities) for each of the robotic joint servo controllers are the same as the desired joint positions and/or joint velocities that become an input to the quadratic program.

In some embodiments, a subset of the control parameters of the robotic device 300 can function in a "position control" mode. In some embodiments, a subset of the control parameters of the robotic device can function in a "force control" mode. In some embodiments, certain components in the computing architecture 304 (e.g., the reference trajectory generation module 308, the MPC 310, and/or the inverse dynamics module 316) can run at a refresh rate while the robot is in operation (e.g., as the environment and/or internal state of the robotic device 300 change over time). In some embodiments, the refresh rate is in the range of 200-500 Hz, or about 300 Hz in one exemplary embodiment. In some embodiments, other components such as joint-level position and/or force servo controllers can run at a higher refresh rate, e.g., in the range of 750-4000 Hz, or about 3000 Hz in one exemplary embodiment.

In some embodiments, the robotic device 300 can practice "behavior sequencing" or "behavior blending", e.g., by populating a queue of behaviors using a planner. In some embodiments, the planner is part of the perception module 302 or is in communication with the perception module 302. The computing architecture 304 (e.g., the MPC 310) can then create smooth connections between behaviors, blending behaviors to create fluid motions. For example, the landing stage of one jump can blend into the take-off stage of another jump, rather than having the robot jump, come to a full stop, and then initiate another jump. In some embodiments, blending can arise as a byproduct of the cost structure of the MPC 310, which can promote smooth changes in momentum and/or force over time. In some embodiments, costs can be added manually for behaviors that an operator observes to be undesirable (e.g., trying to bend over too close to 90 degrees, or not leaving enough time to start applying forces to larger objects).

Figure 3B:
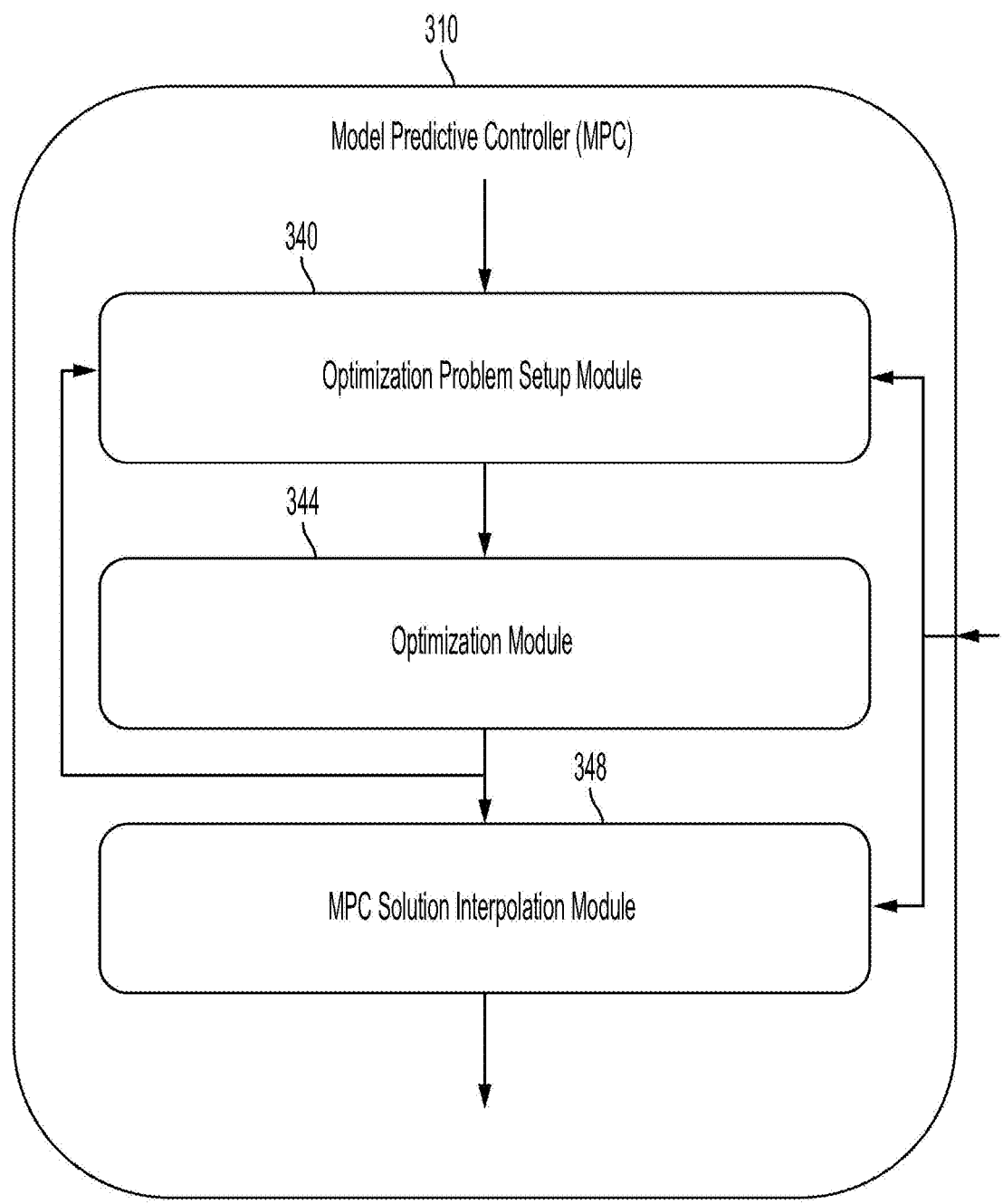
FIG. 3B illustrates further details of an example model predictive controller (MPC) for a robotic device, according to an illustrative embodiment of the invention.

FIG. 3B illustrates further details of an example MPC 310 for a robotic device 300, according to an illustrative embodiment of the invention. In FIG. 3B, the MPC 310 receives input sufficient to define an optimization problem (e.g., to achieve one or more objectives subject to one or more constraints). In some embodiments, the input includes one or more of the following: one or more reference behavior specifications for the robotic device 300; one or more reference trajectories for the robotic device 300; one or more characteristics of one or more massive bodies coupled to the robotic device 300 (or expected to be coupled to the robotic device 300); a current state of the robotic device 300; a goal state and/or location of the robotic device 300; a goal state (e.g., including a location) of one or more massive bodies coupled to the robotic device 300 (or expected to be coupled to the robotic device 300); and/or a goal state trajectory of the robotic device 300 (e.g., reflecting a goal pose and/or twist of one or more massive bodies coupled, or expected to be coupled, to the robotic device 300 as a function of time). In some embodiments, the input can include one or more physical and/or internally inconsistent reference trajectories for the robot and/or one or more massive bodies, which the MPC 310 can then address within its optimization framework.

Such input can be provided to the optimization problem setup module 340, which can reduce and/or reformat the input as optimization problem data to be provided to the optimization module 344. The optimization module 344 can then compute one or more solution trajectories for the robotic device 300 and/or any massive bodies accounted for in the optimization problem data. The one or more solution trajectories for the robotic device 300 can then be provided to the MPC solution interpolation module 348 (or back to the optimization problem setup module 340, where further optimization is desired), which can output a set of one or more movement parameters for the robotic device 300. In some embodiments, further optimization can be desirable in cases in which: (1) the previous solution provides a "warm start" for the next optimization (e.g., to start the optimization procedure from a trajectory that is already close to the optimal trajectory); and/or (2) the previous solution also enters the optimization problem data as part of an explicit "previous solution smoothing" objective term, which can help avoid sudden changes in the solution trajectory, which the robot may not be able to track. The set of one or more movement parameters can reflect a goal trajectory (e.g., for the robot to move from its current state to a goal state) or a solution trajectory. This output can pass to the inverse dynamics module 316 as described above. In some embodiments, the kinematic state estimation module 303 can provide input directly to the optimization problem setup module 340 and/or the MPC solution interpolation module 348 (as indicated by the flow arrows in FIG. 3B).

Figure 4:
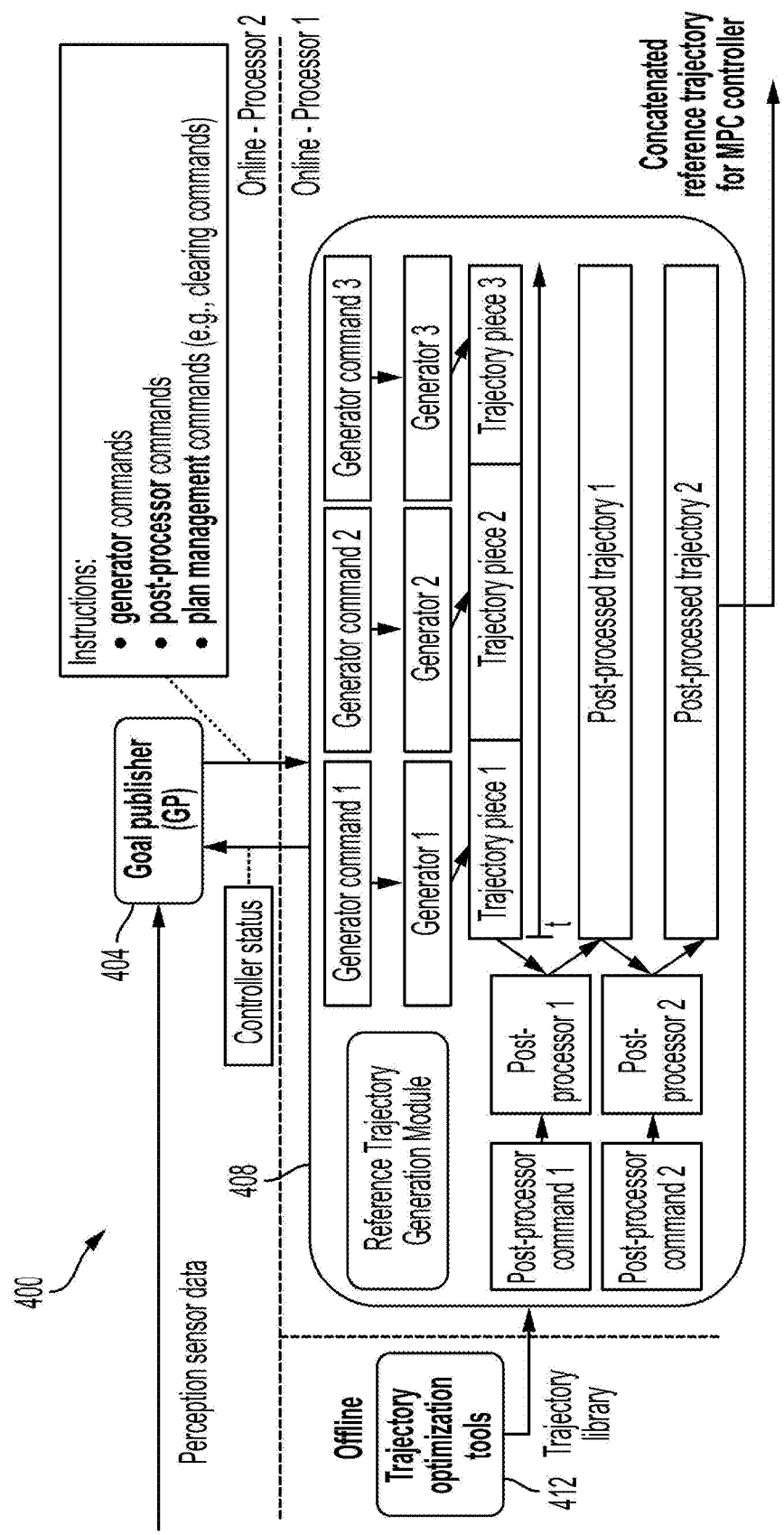
FIG. 4 is a control system flow diagram for determining motion objectives for a robot at runtime, according to an illustrative embodiment of the invention.

FIG. 4 is a control system flow diagram 400 for determining motion objectives for a robot (e.g., the robotic devices 100, 200, and/or 300 shown and described above) at runtime, according to an illustrative embodiment of the invention. During operation the robot receives perception sensor data at a goal publisher 404 (which may be included in, for example the perception module 303 shown and described above in FIG. 3A). The goal publisher 404 then determines a set of instructions to be passed to the Reference Trajectory Generation Module 408 (e.g., the reference trajectory generation module 308 shown and described above in FIG. 3A). In some embodiments, the set of instructions includes one or more of the following: generator commands; post-processor commands; and/or plan management commands. In FIG. 4, three generator commands are shown (Generator command 1, Generator command 2, and Generator command 3), although different numbers of commands are possible in practice. Generator commands can correspond to commanding the robot to perform a variety of actions, such as taking a step, jumping, or other contained motions. Each generator command is provided to a respective Generator to produce a respective trajectory piece (e.g., Generator command 1 is provided to Generator 1 to produce Trajectory piece 1; Generator command 2 is provided to Generator 2 to produce Trajectory piece 2; etc.), which together can form a larger trajectory planned to occur over a time horizon t (which may be, for example, between 1 and 2 seconds).

The trajectory is then passed to a series of post-processing operations, which are directed by a series of post-processor commands. Post-processor commands can correspond to operations such as modifying or adding a further set of specifications to a particular trajectory. For example, if a 180-degree jump trajectory is the starting trajectory, an additional trajectory can be added to manipulate an end effector. In FIG. 4, two post-processing operations are shown (Post-processor command 1 is provided to post-processor 1 to transform the trajectory into post-processed trajectory 1; and Post-processor command 2 is provided to post-processor 2 to transform the post-processed trajectory 1 into post-processed trajectory 2), although different numbers of post-processing operations are possible in practice. In some embodiments, the trajectory pieces corresponding to the generator commands are concatenated as part of the post-processing operations (e.g., at generator command trajectory boundaries). The final post-processed trajectory is provided as a reference trajectory to the MPC (e.g., the MPC 310 shown and described above in FIG. 3A and/or FIG. 3B).

During operation, the Reference Trajectory Generation Module 408 can execute on a first physical processor, and the goal publisher 404 can execute on a second physical processor, with the multiple generators and processors described utilizing the same physical processor to perform the indicated processing operations. The Reference Trajectory Generation Module 408 can also provide a status of the controller to the goal publisher 404 (e.g., to inform further planning operations by the goal publisher 404). The Reference Trajectory Generation Module 408 can also draw upon offline trajectory optimization tools 412 (e.g., the trajectory library 306 shown and described above in FIG. 3A). In some embodiments, the trajectory library 306 includes no information about massive bodies with which the robot interacts, with such adaptations being made entirely in the online phase during operation.

In some embodiments, reference trajectory generation is a serial process (e.g., where generator commands are processed in order and then post-processor commands are processed in order). In some embodiments, commands are sent from the goal publisher on the second physical processor to the MPC reference trajectory generator/control stack on the first physical processor (e.g., asynchronously at a variable rate) and are processed by the Reference Trajectory Generation Module 408 at every "supervisor" control time step. In some embodiments, the Reference Trajectory Generation Module 408 sends a status message back to the goal publisher after it has finished generating the latest reference trajectory. In some embodiments, the status message includes one or more of the following: an ID of the generator command currently at the front of the queue; timing information for the trajectory piece associated with the generator command; or identifications of which post-processor commands are still being executed. In some embodiments, the goal publisher process uses this information to modify (e.g., at a relatively lower rate) the commands it sends to the first physical processor.

Figure 5:
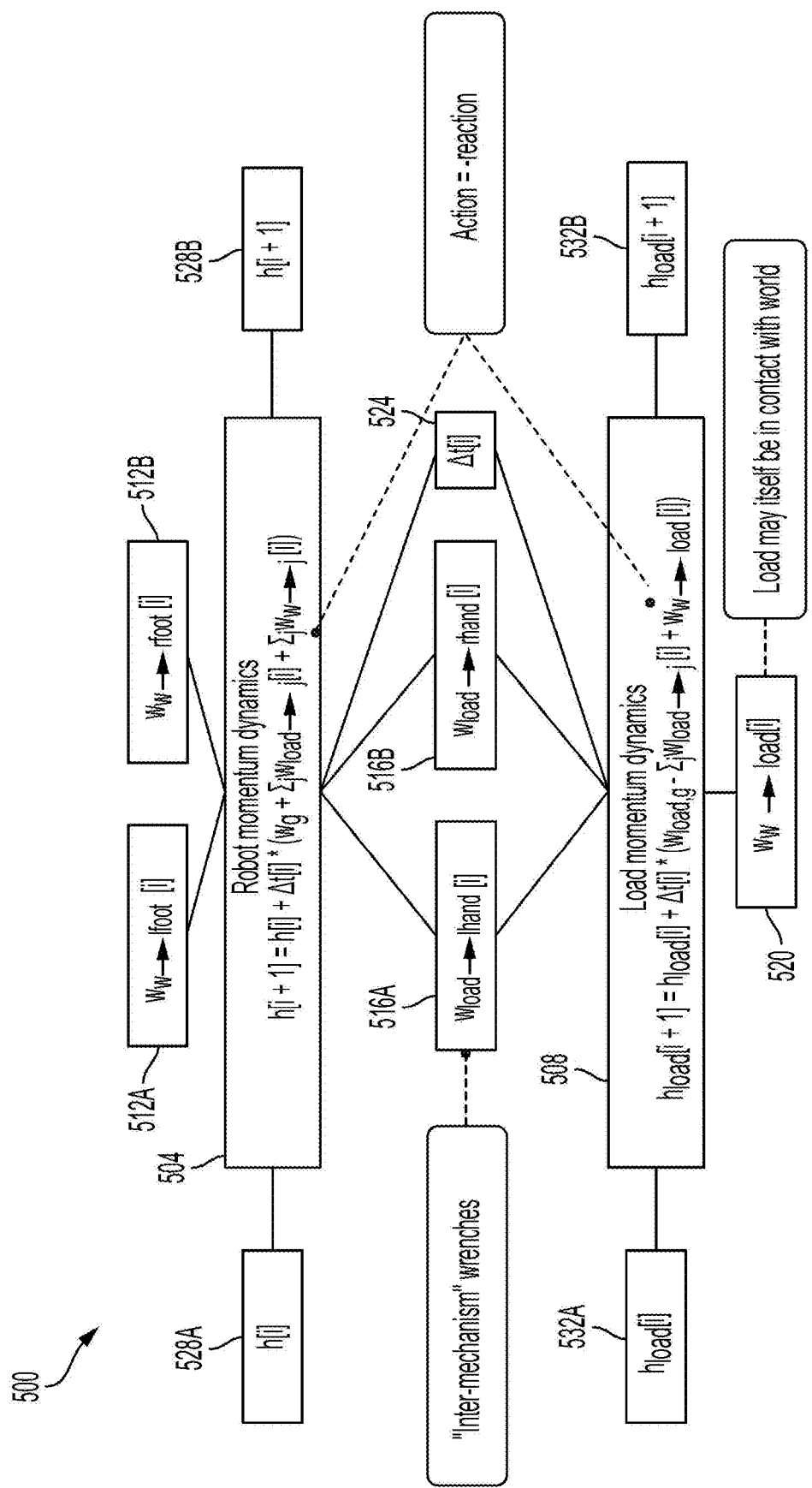
FIG. 5 is a diagram illustrating the determination of momentum constraints by a bipedal robot interacting with one rigid body, according to an illustrative embodiment of the invention.

FIG. 5 is a diagram 500 illustrating the determination of momentum constraints by a bipedal robot interacting with one rigid body, according to an illustrative embodiment of the invention. The diagram 500 illustrates the momentum dynamics for a robot (block 504) and a single massive body (or load) with which it interacts (block 508), although one having ordinary skill in the art will appreciate that multiple massive bodies could be accounted for in a similar fashion. The equations of motion in blocks 504, 508 illustrate how the momentum changes for the robot and the load, respectively, in the presence of an applied force. In FIG. 5, the mathematical architecture illustrated separates the state variables for the robot and the load, which are constrained by the fundamental physical relation that every action has an equal and opposite reaction, as indicated in FIG. 5. However, one having ordinary skill in the art will appreciate that a different mathematical representation could be chosen to describe the same physical reality, e.g., a single set of variables could instead be depicted for a composite body comprising the robot and one or more coupled massive bodies.

As shown in FIG. 5, multiple variables can affect the equations of motions in blocks 504, 508, and one having ordinary skill in the art will here again appreciate that the particular mathematical details may be expressed in different ways, with FIG. 5 representing one exemplary way. In FIG. 5, block 512A represents the wrench (w) associated with the left foot of the robot interacting with the world (w→lfoot (i.e., world→left foot)) at time step i, and block 512B represents the wrench associated with the right foot of the robot interacting with the world (w→rfoot (i.e., world→right foot)) at time step i. Similarly, block 516A represents the wrench associated with the left hand of the robot interacting with the world (w→lhand) at time step i, and block 516B represents the wrench associated with the right hand of the robot interacting with the world (w→rhand) at time step i. Block 520 represents the wrench associated with the load interacting with the world (w→load) at time step i. $\Delta t$, shown in block 524, represents the duration of time step i. Blocks 528A-B represent the momentum of the robot at time steps i and i+1, respectively, and blocks 532A-B represent the momentum of the load at time steps i and i+1, respectively.

Figure 6A:
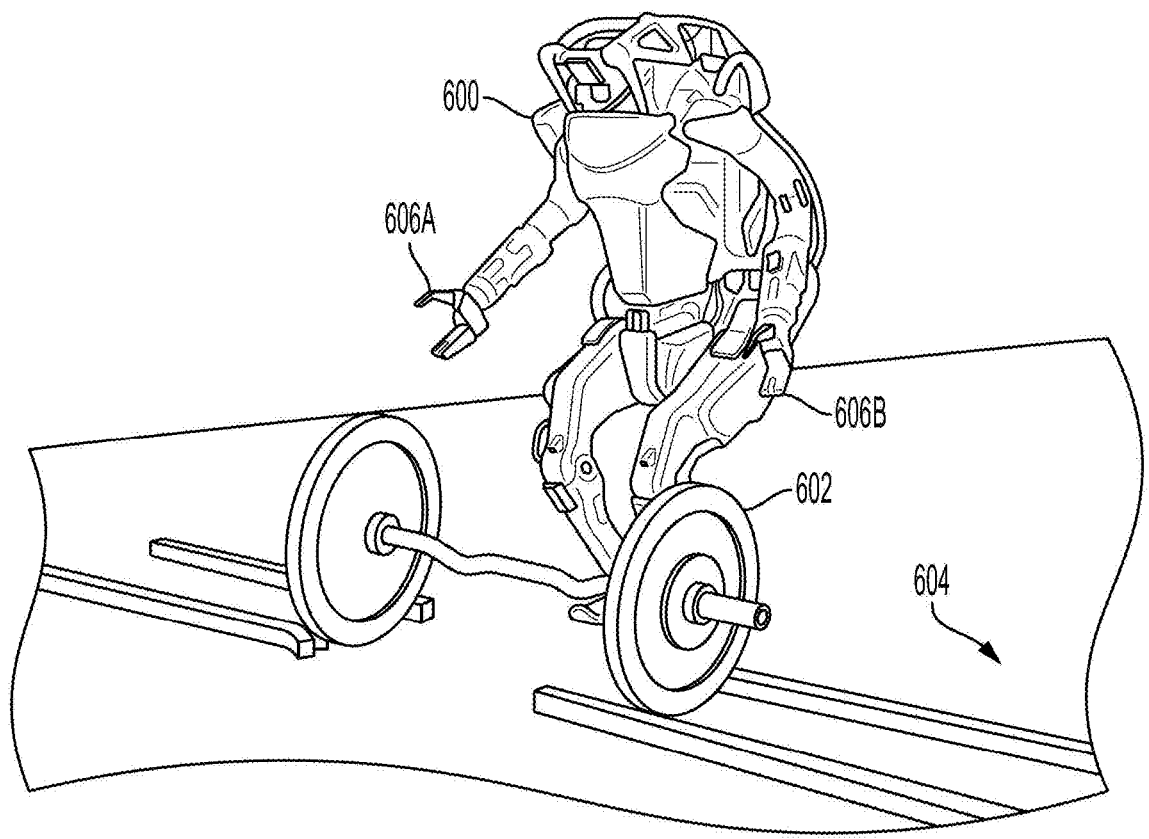
FIGS. 6A-6F are sequential views of a real-world humanoid robot manipulating a curl bar, according to an illustrative embodiment of the invention.
Figure 6B:
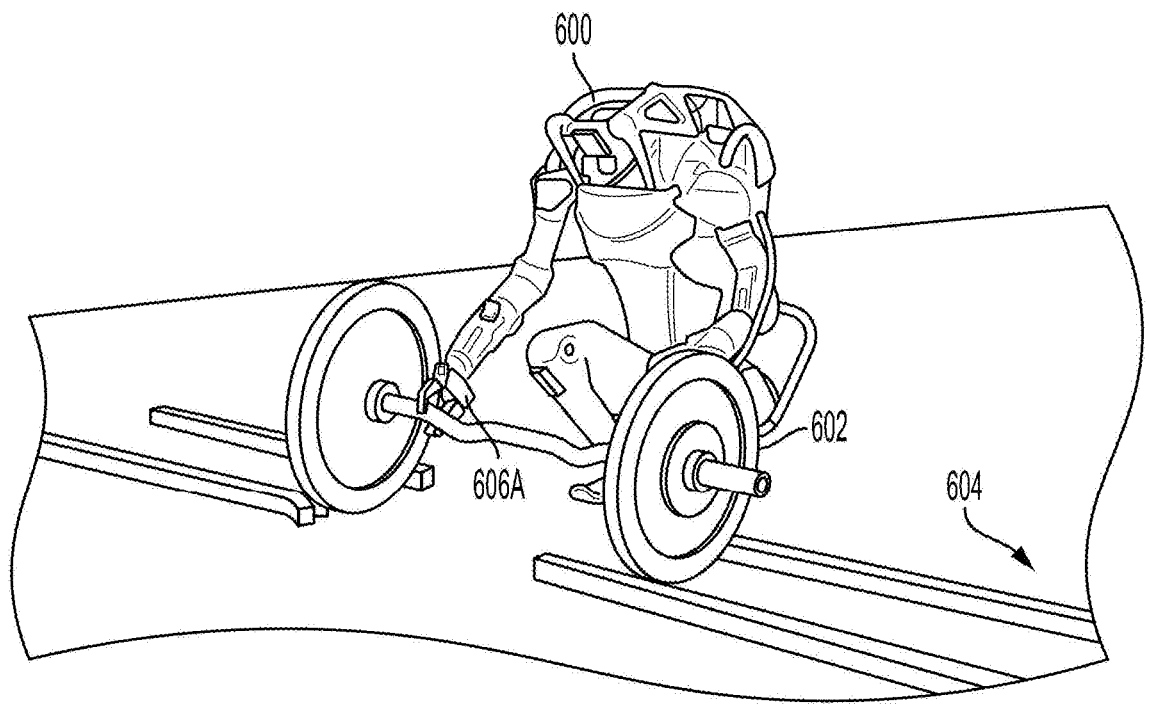
Figure 6C:
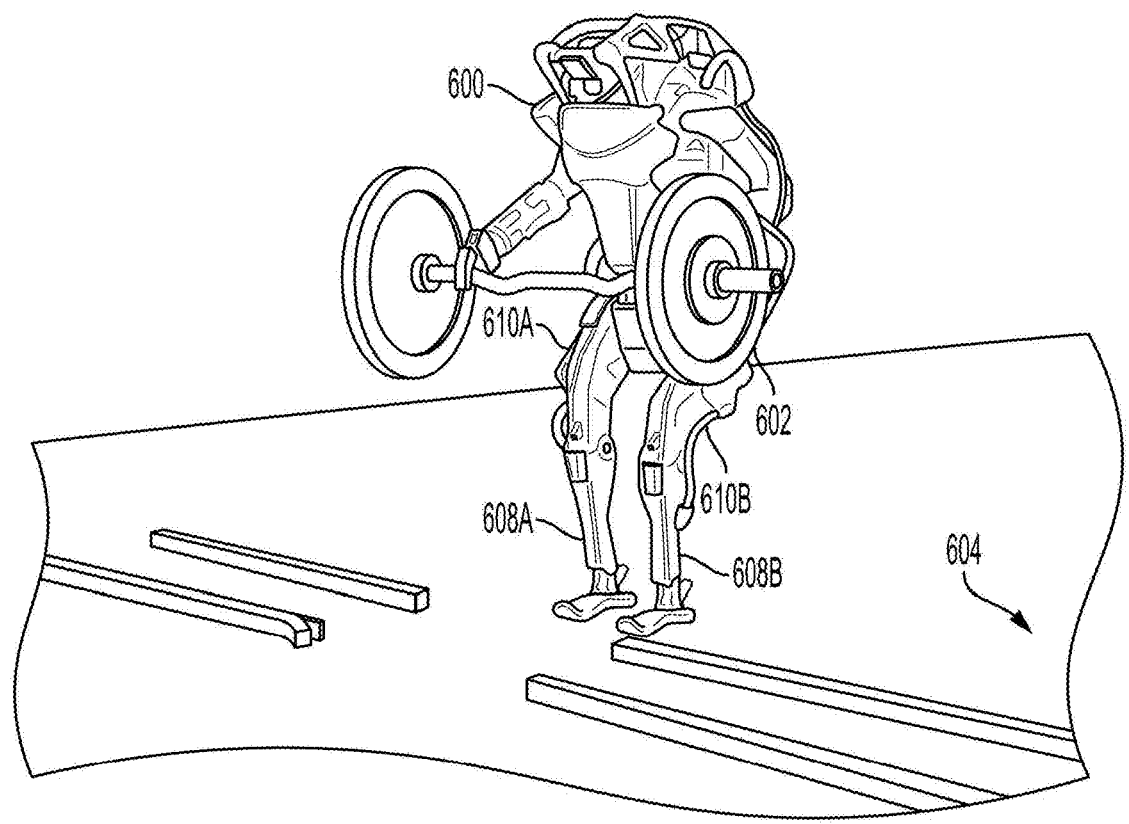
Figure 6D:
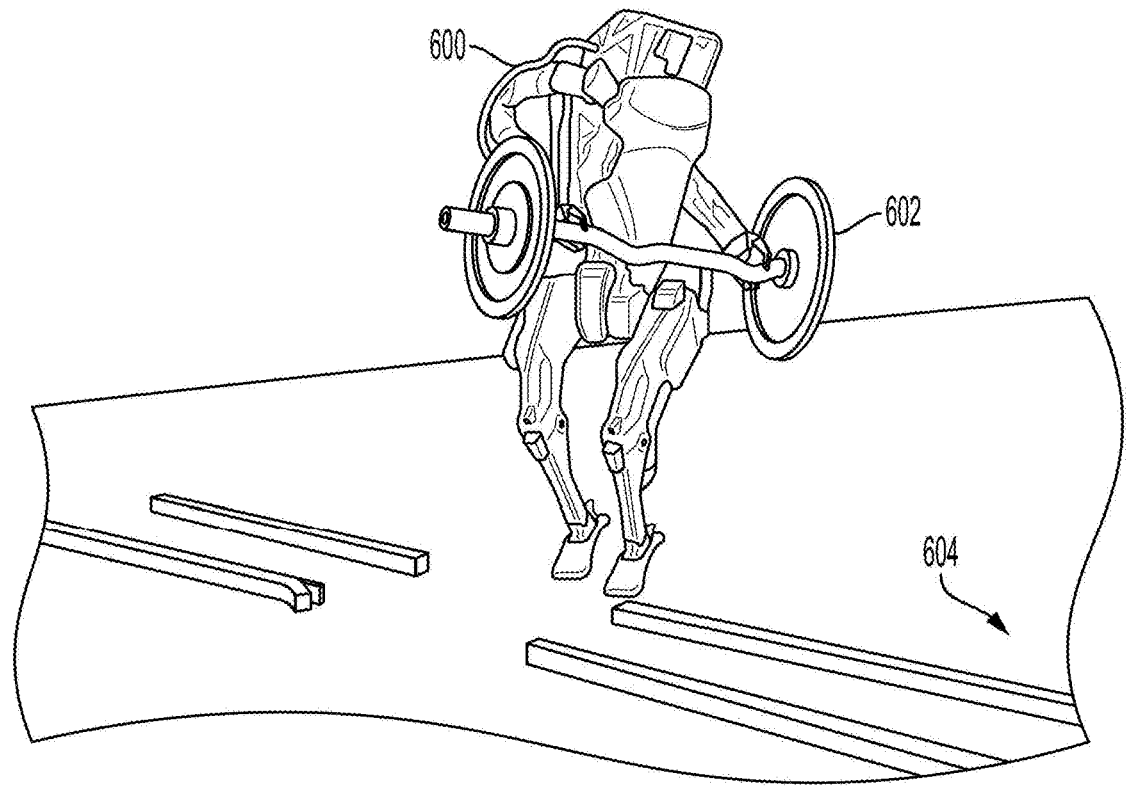
Figure 6E:
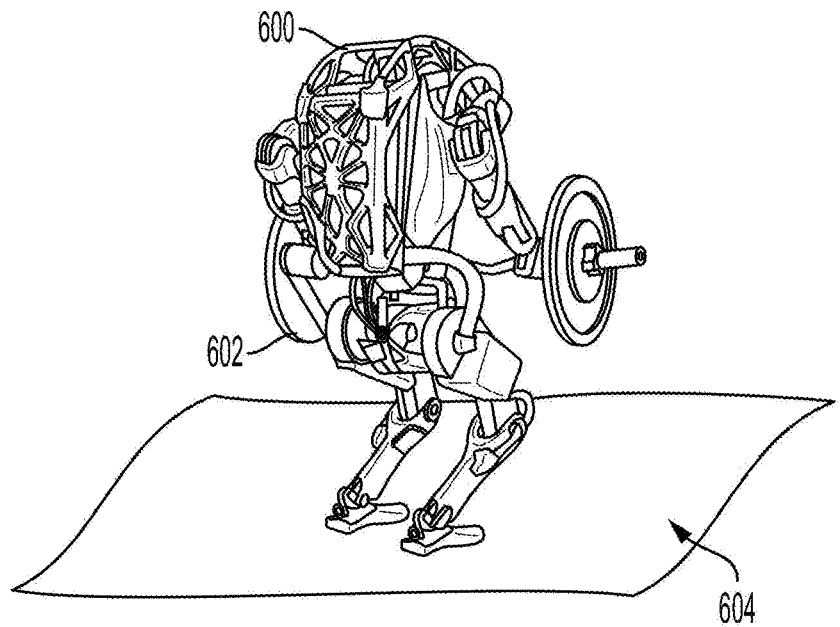
Figure 6F:
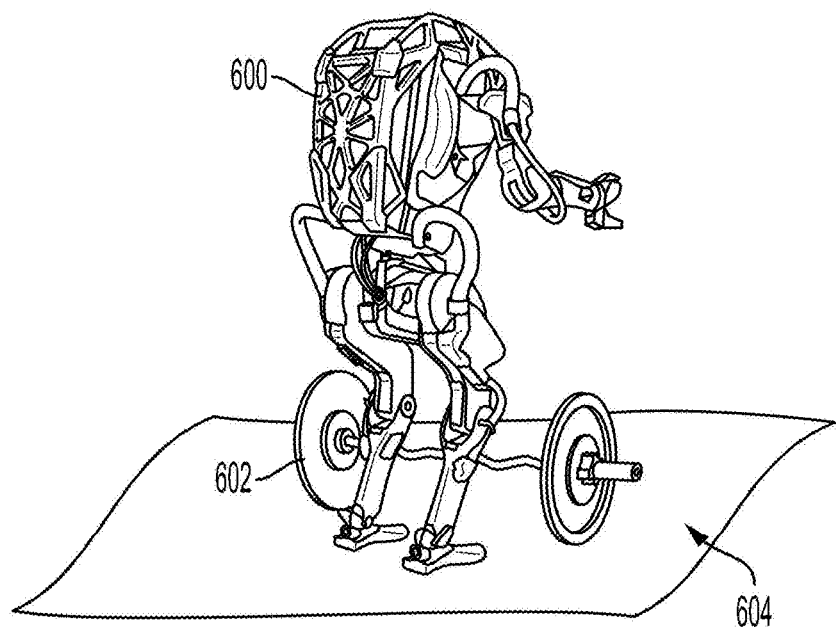

FIGS. 6A-6F are sequential views of a real-world humanoid robot 600 manipulating a curl bar 602, according to an illustrative embodiment of the invention. The robot 600 and the curl bar 602 start out positioned on a ground surface 604, as shown in FIG. 6A, with the robot 600 in an initial stance and the curl bar 602 at rest. The robot 600 then crouches to pick up the curl bar 602, which it grasps using its end effectors 606A, 606B, as shown in FIG. 6B. The robot 600 then lifts the curl bar 602 up, assuming a stance approximately mirroring its initial stance, except with certain visible differences to offset the additional force of the curl bar 602 (e.g., its lower leg members 608A, 608B and upper leg members 610A, 610B are now closer to parallel with each other). The robot 600 then jumps and twists around 180 degrees while holding the curl bar 602, as shown in FIG. 6D, and lands on the ground surface 604 facing the opposite direction, as shown in FIG. 6E. The robot 600 then drops the curl bar 602 on the ground surface 604 while maintaining an upright stance, as shown in FIG. 6F.

Figure 7A:
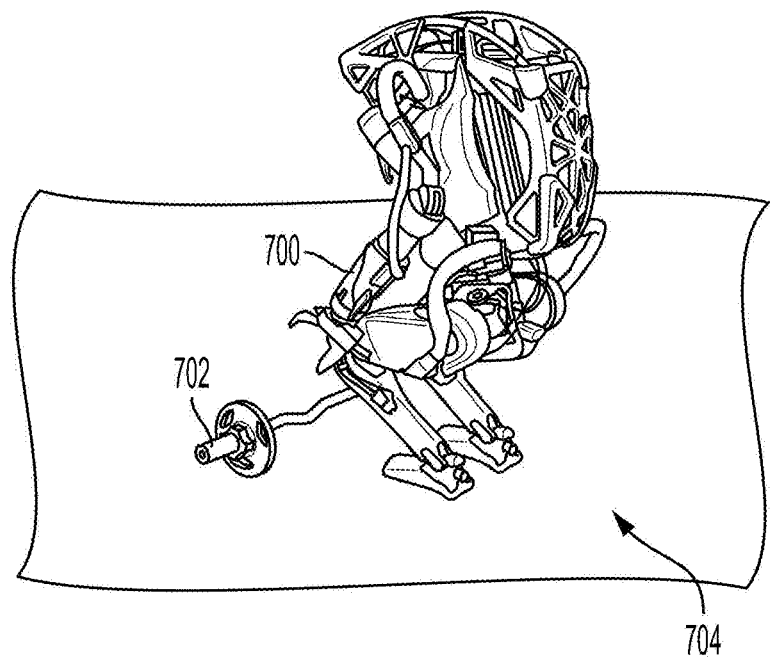
FIGS. 7A-7F are sequential views of a real-world humanoid robot manipulating a curl bar, according to an illustrative embodiment of the invention.
Figure 7B:
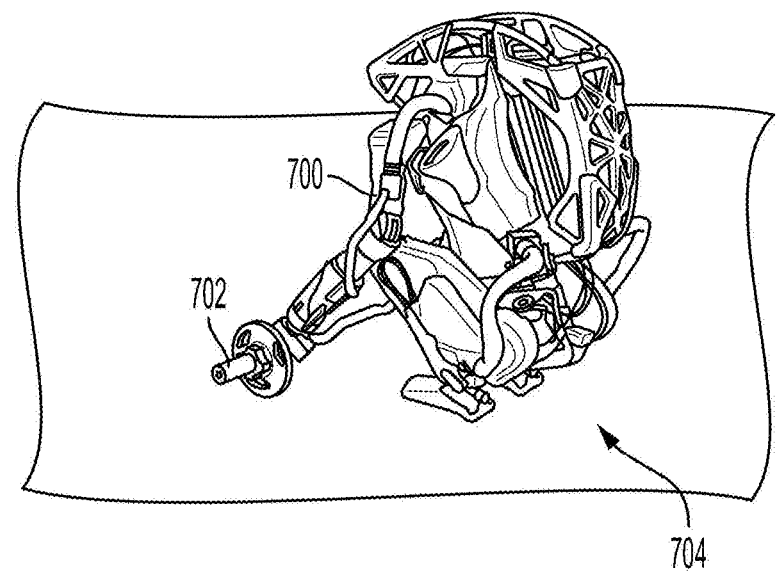
Figure 7C:
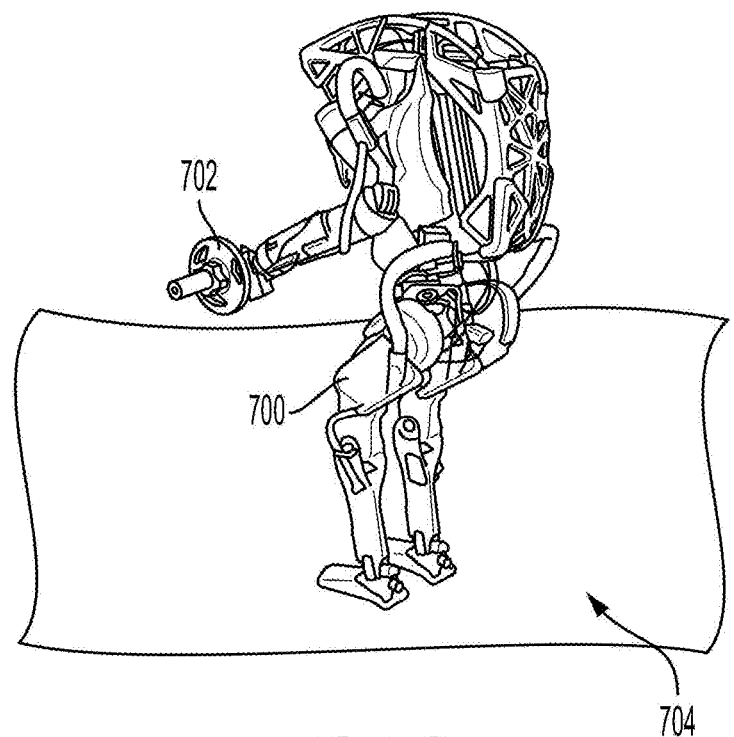
Figure 7D:
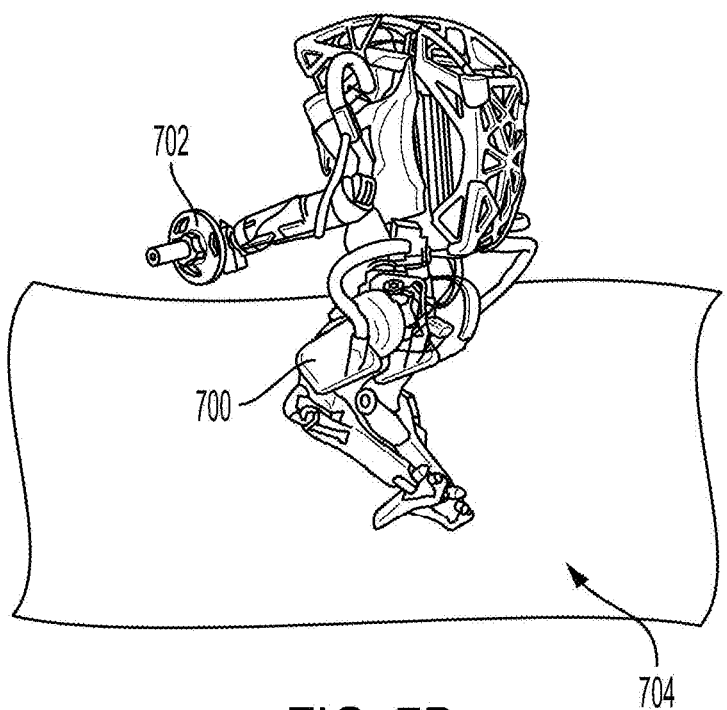
Figure 7E:
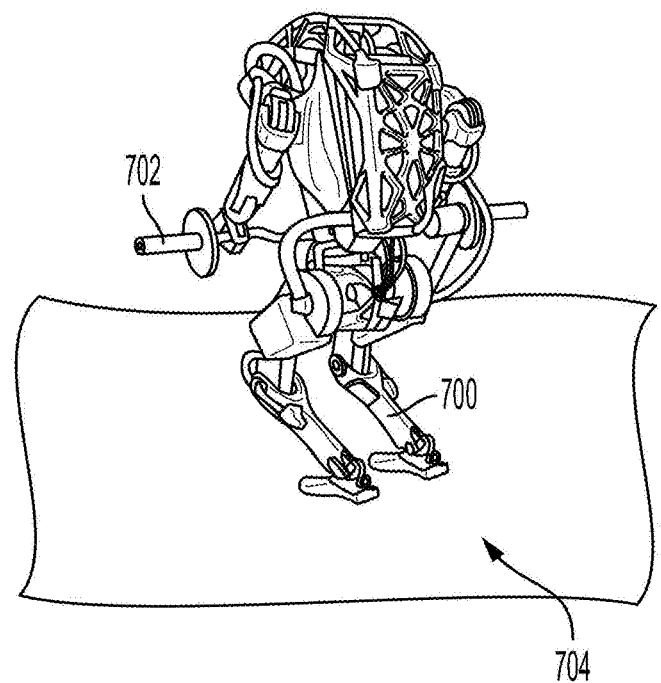
Figure 7F:
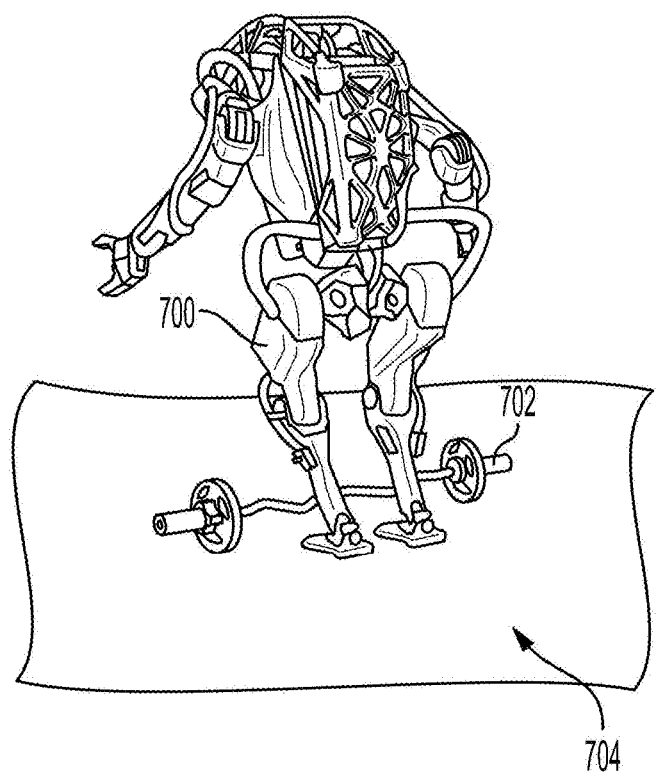

FIGS. 7A-7F are sequential views of a real-world humanoid robot 700 manipulating a curl bar 702, according to an illustrative embodiment of the invention. The robot 700 and the curl bar 702 both start out positioned on a ground surface 704, as shown in FIG. 7A, with the robot 700 in an initial stance and the curl bar 702 at rest. The robot 700 then crouches to pick up the curl bar 702, which it grasps using its end effectors (similarly to the sequence above in FIGS. 6A-6F), as shown in FIG. 7B. The robot 700 then lifts the curl bar 702 up, as shown in FIG. 7C, and proceeds to jog along the ground surface 704, as shown in FIG. 7D. The robot 700 then stops in place, as shown in FIG. 7E, and drops the curl bar 702 onto the ground surface 704, as shown in FIG. 7F.

Figure 8A:
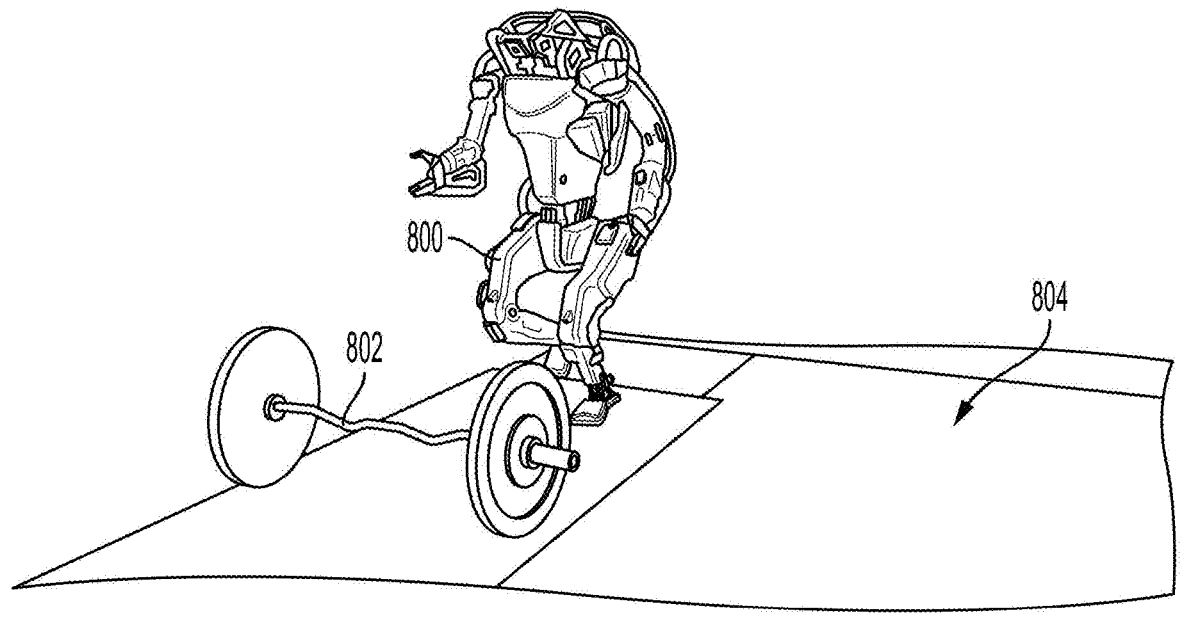
FIGS. 8A-8F are sequential views of a real-world humanoid robot manipulating a curl bar while traversing an obstacle course, according to an illustrative embodiment of the invention.
Figure 8B:
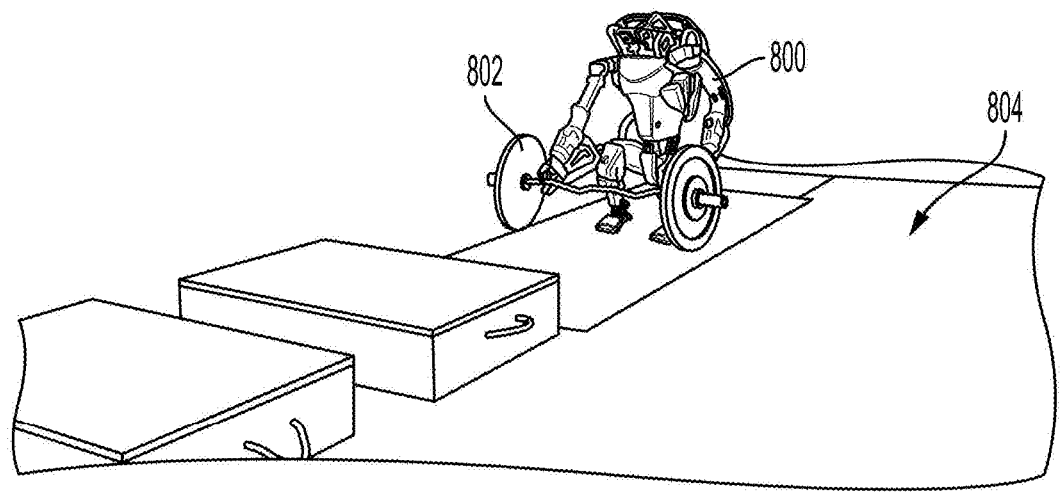
Figure 8C:
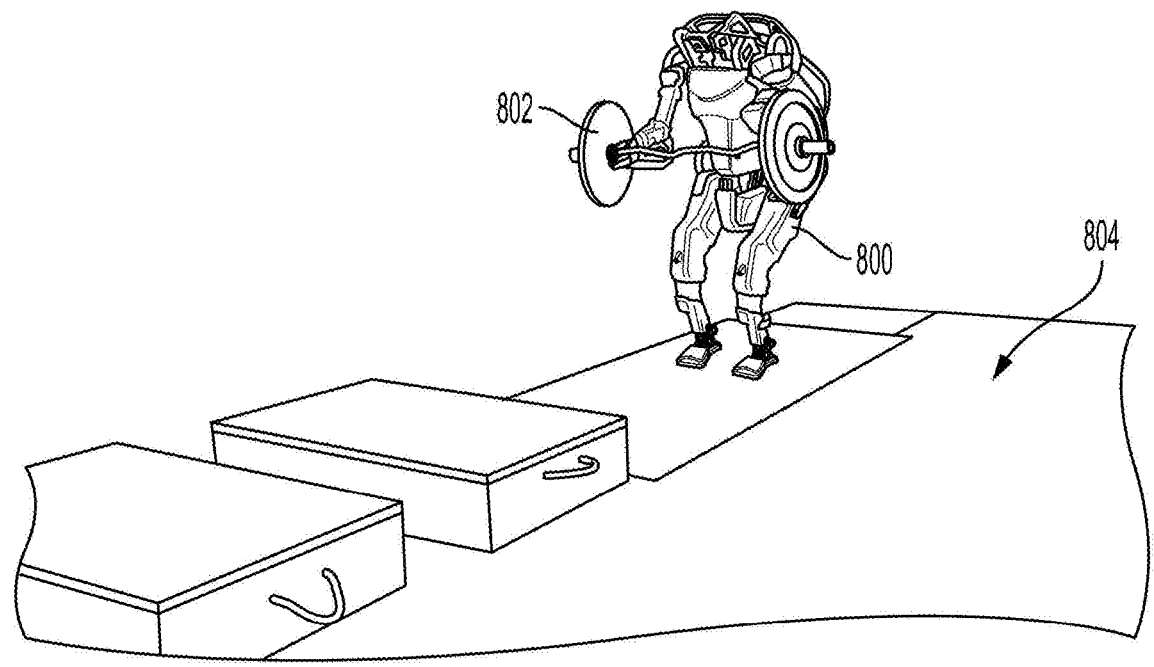
Figure 8D:
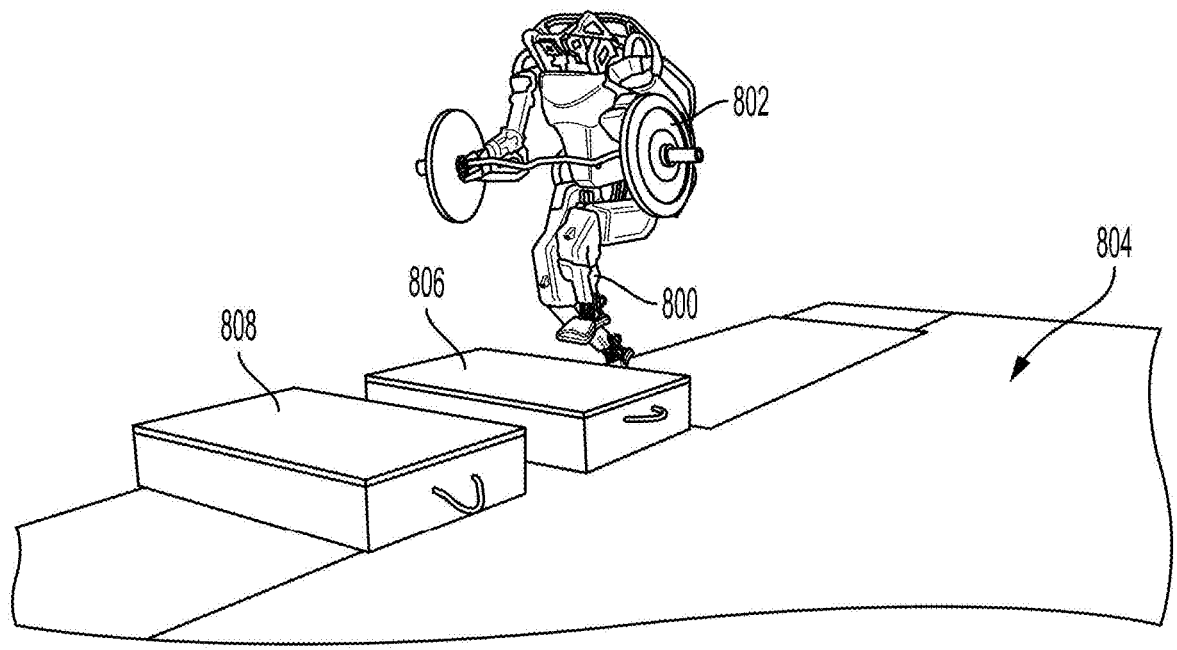
Figure 8E:
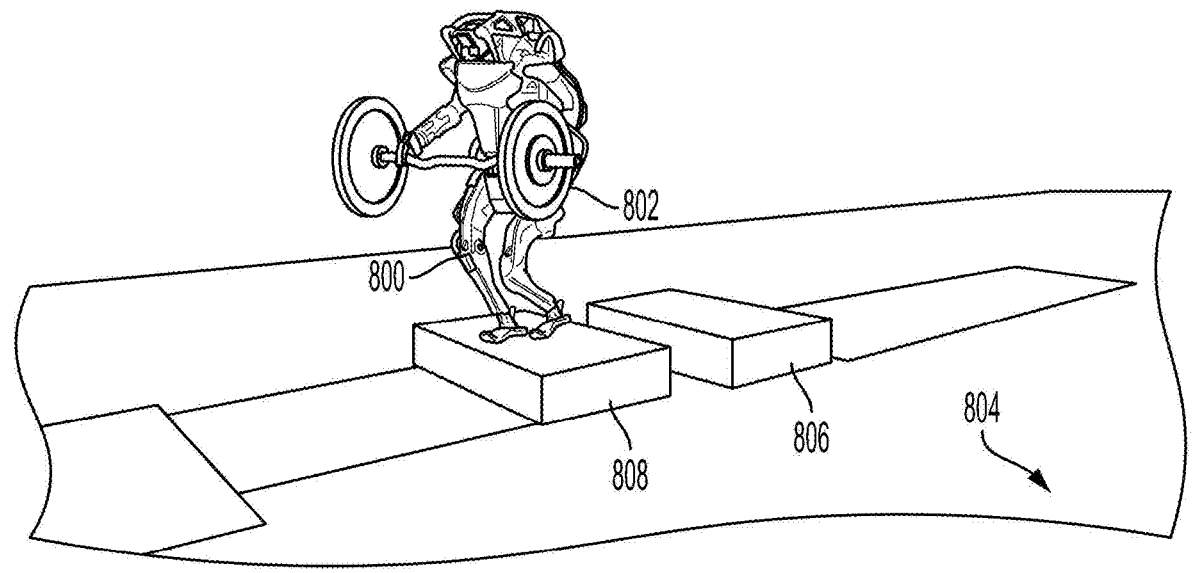
Figure 8F:
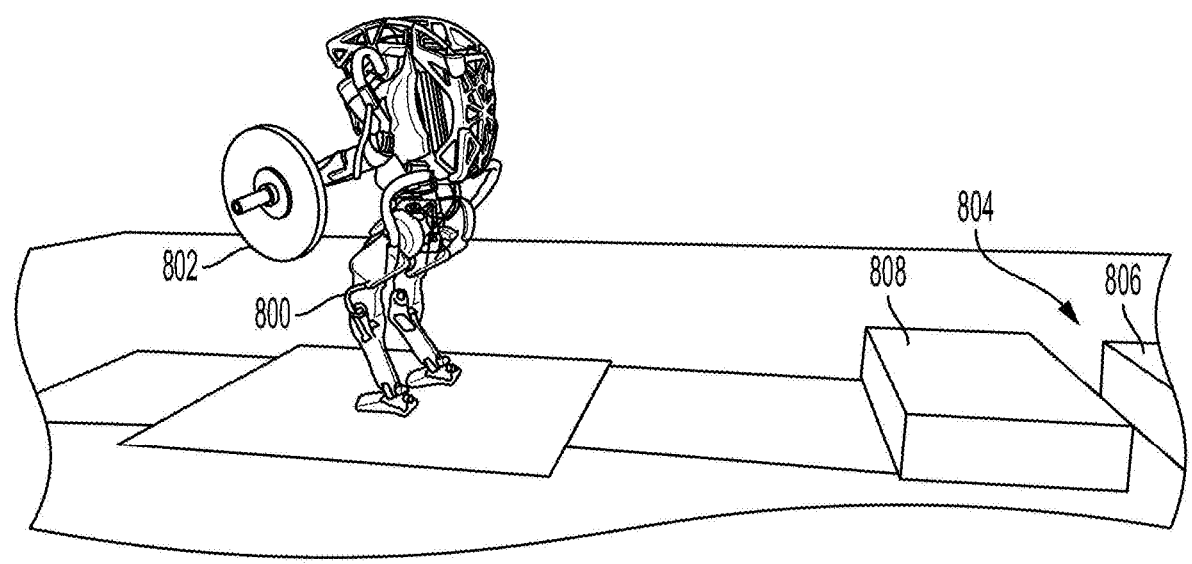

FIGS. 8A-8F are sequential views of a real-world humanoid robot 800 manipulating a curl bar 802 while traversing an obstacle course, according to an illustrative embodiment of the invention. The robot 800 and the curl bar 802 both start out positioned on a ground surface 804, as shown in FIG. 8A, with the robot 800 moving toward the curl bar 802, which is at rest. The robot 800 then crouches to pick up the curl bar 802, as shown in FIG. 8B, which it grasps using its end effectors (similarly to the sequences above in FIGS. 6A-6F and 7A-7F). The robot 800 then lifts the curl bar 802 up, as shown in FIG. 8C, and proceeds to jog along the ground surface 804, eventually moving up onto a first obstacle 806, as shown in FIG. 8D, and then over to a second obstacle 808, as shown in FIG. 8E. The robot 800 continues past the second obstacle 808 still holding the curl bar 802, as shown in FIG. 8F.

Figure 9:
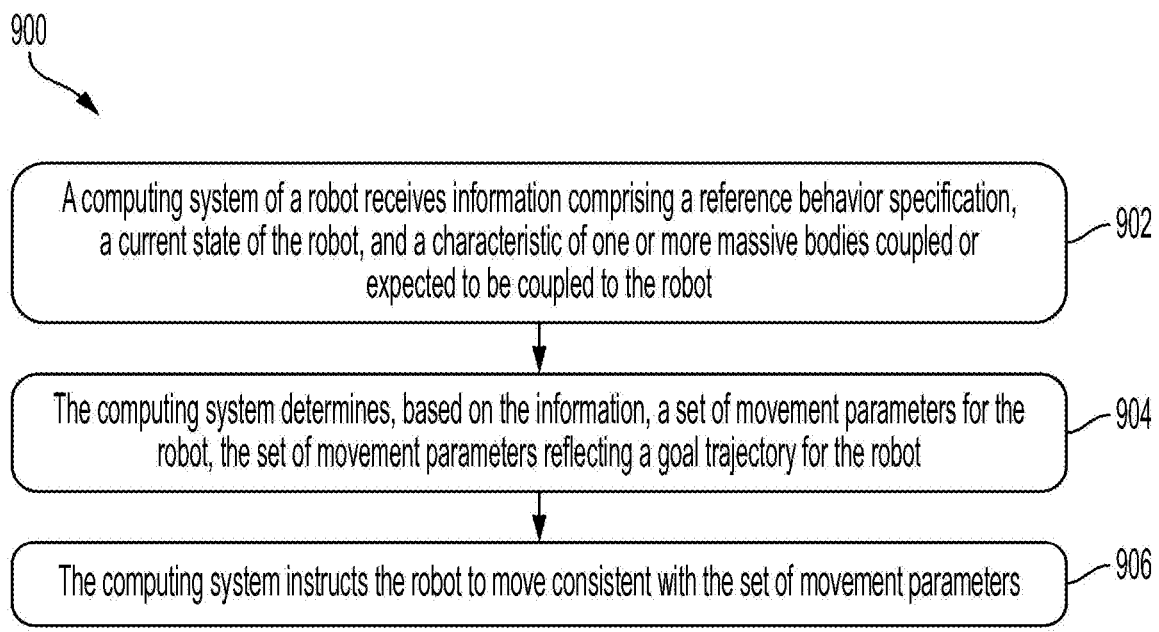
FIG. 9 is a flowchart of an exemplary computer-implemented method, according to an illustrative embodiment of the invention.

FIG. 9 is a flowchart of an exemplary method 900, according to an illustrative embodiment of the invention. At operation 902, a computing system of a robot receives information comprising a reference behavior specification (e.g., of or associated with the robot and/or a massive body coupled or expected to be coupled to the robot), a current state of the robot, and a characteristic of a massive body coupled or expected to be coupled to the robot. At operation 904, the computing system determines, based on the information, a set of movement parameters for the robot, the set of movement parameters reflecting a goal trajectory for the robot. At operation 906, the computing system instructs the robot to move consistent with the set of movement parameters.

A number of implementations have been described. Nevertheless, it will be understood that various modifications may be made without departing from the spirit and scope of the disclosure.

The invention claimed is:

1. A computer-implemented method comprising:
receiving, by a computing system of a mobile robot, information comprising a reference behavior specification, a current state of the mobile robot, and a characteristic of one or more massive bodies coupled to or expected to be coupled to the mobile robot;
determining, by the computing system, based on the information, a set of movement parameters for the mobile robot, the set of movement parameters reflecting a goal trajectory for the mobile robot, wherein the set of movement parameters is determined, in part, to maintain balance of the mobile robot; and
instructing, by the computing system, the mobile robot to move consistent with the set of movement parameters.

2. The method of claim 1, further comprising determining a reference trajectory for the mobile robot, wherein determining the set of movement parameters for the mobile robot is based on the reference trajectory.

3. The method of claim 1, wherein the reference behavior specification comprises at least one of (i) a target spatial region for at least a portion of the mobile robot to occupy, or (ii) a target spatial region for at least a portion of at least one of the one or more massive bodies to occupy.

4. The method of claim 1, wherein the current state of the mobile robot comprises one or more parameters reflecting at least a current position and a current velocity of the mobile robot.

5. The method of claim 1, further comprising computing, based on the set of movement parameters, a joint torque for each of one or more joints of the mobile robot, and wherein instructing the mobile robot to move consistent with the set of movement parameters comprises instructing the mobile robot based, at least in part, on the joint torques.

6. The method of claim 1, further comprising determining, based on the set of movement parameters, a set of actuator inputs for execution on the mobile robot, and wherein instructing the mobile robot to move consistent with the set of movement parameters comprises instructing the mobile robot based, at least in part, on the set of actuator inputs.

7. The method of claim 1, wherein the goal trajectory for the mobile robot is determined based on a goal state for the one or more massive bodies.

8. The method of claim 1, wherein the characteristic of the on or more massive bodies is sensed by the mobile robot based on at least one of (i) a force sensed by the mobile robot, (ii) a torque about a joint of the mobile robot sensed by the mobile robot, (iii) an image sensed by the mobile robot, (iv) an object classification algorithm included on the mobile robot, or (v) input by an operator of the mobile robot.

9. The method of claim 1, wherein the goal trajectory reflects the mobile robot performing at least one manipulation task.

10. The method of claim 1, further comprising:
determining the goal trajectory by (i) determining a first trajectory; (ii) determining a second trajectory; and (iii) concatenating the first trajectory with the second trajectory to produce a concatenated trajectory as the goal trajectory.

11. The method of claim 1, wherein the goal trajectory reflects at least one motion constraint based on an internal limitation of the mobile robot, a limitation imposed on the mobile robot by the one or more massive bodies, or an expected collision of the mobile robot.

12. The method of claim 1, wherein instructing the mobile robot to move is based on a composite characteristic of the mobile robot and the one or more massive bodies.

13. A computing system of a mobile robot comprising:
data processing hardware; and
memory hardware in communication with the data processing hardware, the memory hardware storing instructions that when executed on the data processing hardware cause the data processing hardware to perform operations comprising:
receiving information comprising a reference behavior specification, a current state of the mobile robot, and a characteristic of one or more massive bodies coupled to or expected to be coupled to the mobile robot;
determining, based on the information, a set of movement parameters for the mobile robot, the set of movement parameters reflecting a goal trajectory for the mobile robot, wherein the set of movement parameters is determined, in part, to maintain balance of the mobile robot; and
instructing the mobile robot to move consistent with the set of movement parameters.

14. The system of claim 13, wherein the operations further comprise:
determining a reference trajectory for the mobile robot, wherein determining the set of movement parameters for the mobile robot is based on the reference trajectory.

15. The system of claim 13, wherein the reference behavior specification comprises at least one of (i) a target spatial region for at least a portion of the mobile robot to occupy, or (ii) a target spatial region for at least a portion of at least one of the one or more massive bodies to occupy.

16. The system of claim 13, wherein the current state of the mobile robot comprises one or more parameters reflecting at least a current position and a current velocity of the mobile robot.

17. The system of claim 13, wherein the operations further comprise:
computing, based on the set of movement parameters, a joint torque for each of one or more joints of the mobile robot, and wherein instructing the mobile robot to move consistent with the set of movement parameters comprises instructing the mobile robot based, at least in part, on the joint torques.

18. The system of claim 13, wherein the operations further comprise:
determining, based on the set of movement parameters, a set of actuator inputs for execution on the mobile robot, and wherein instructing the mobile robot to move consistent with the set of movement parameters comprises instructing the mobile robot based, at least in part, on the set of actuator inputs.

19. The system of claim 13, wherein the goal trajectory for the mobile robot is determined based on a goal state for the one or more massive bodies.

20. The system of claim 13, wherein the characteristic of the one or more massive bodies is sensed by the mobile robot based on at least one of (i) a force sensed by the mobile robot, (ii) a torque about a joint of the mobile robot sensed by the mobile robot, (iii) an image sensed by the mobile robot, (iv) an object classification algorithm included on the mobile robot, or (v) input by an operator of the mobile robot.

21. The system of claim 13, wherein the goal trajectory reflects the mobile robot performing at least one manipulation task.

22. The system of claim 13, wherein the operations further comprise determining the goal trajectory by (i) determining a first trajectory; (ii) determining a second trajectory; and
(iii) concatenating the first trajectory with the second trajectory to produce a concatenated trajectory as the goal trajectory.

23. The system of claim 13, wherein the goal trajectory reflects at least one motion constraint based on an internal limitation of the mobile robot, a limitation imposed on the mobile robot by the one or more massive bodies, or an expected collision of the mobile robot.

24. The system of claim 13, wherein instructing the mobile robot to move is based on a composite characteristic of the mobile robot and the one or more massive bodies.

* * * * *